United States Patent
Bireley et al.

[11] Patent Number: 5,692,174
[45] Date of Patent: Nov. 25, 1997

[54] QUERY PARALLELISM IN A SHARED DATA DBMS SYSTEM

[75] Inventors: William Robert Bireley, Morgan Hill; Tammie Dang; Paramesh Sampatrai Desai, both of San Jose; Donald James Haderle, Los Gatos; Fen-Ling Lin; Maureen Mae McDevitt, both of San Jose; Akira Shibamiya, Los Altos; Bryan Frederick Smith, Morgan Hill; James Zu-chia Teng, San Jose; Hong Sang Tie, Morgan Hill; Yun Wang, Saratoga; Jerome Quan Wong, Mountain View, all of Calif.; Kathryn Ruth Zeidenstein, Chicago, Ill.; Kou Horng Allen Yang, Santa Clara, Calif.

[73] Assignee: International Business Machines Corporation, Armonk, N.Y.

[21] Appl. No.: 539,637

[22] Filed: Oct. 5, 1995

[51] Int. Cl.⁶ .................................................. G06F 17/30
[52] U.S. Cl. ........................................ 395/603; 395/602
[58] Field of Search ............................... 395/601, 603, 395/610, 602

[56] References Cited

U.S. PATENT DOCUMENTS

| | | | |
|---|---|---|---|
| 4,633,387 | 12/1986 | Hartung et al. | 364/200 |
| 4,769,772 | 9/1988 | Dwyer | 364/300 |
| 5,392,430 | 2/1995 | Chen et al. | 395/650 |
| 5,437,032 | 7/1995 | Wolf et al. | 395/650 |
| 5,471,622 | 11/1995 | Eadline | 395/650 |
| 5,495,606 | 2/1996 | Borden et al. | 395/600 |
| 5,548,770 | 8/1996 | Bridges | 395/800 |
| 5,590,319 | 12/1996 | Cohen et al. | 395/604 |

*Primary Examiner*—Wayne Amsbury
*Assistant Examiner*—Donald Min
*Attorney, Agent, or Firm*—Stern, Kessler, Goldstein & Fox, P.L.L.C.; David J. Kappos, Esq.

[57] ABSTRACT

A system and method for a computer system having a plurality of DBMS providing a coordinating and assisting function. If a DBMS performs a coordinating function, it is referred to as a coordinating DBMS. If a DBMS performs an assisting function, it is referred to as an assisting DBMS. Each coordinating DBMS receives a query from a user application, decomposes the query into multiple parallel tasks, and allocates the parallel tasks to all of the DBMSs in the system. Each assisting DBMS receives one or more parallel tasks from a coordinating DBMS, executes the parallel tasks and returns the results to the coordinating DBMS. The coordinating DBMSs and assisting DBMSs access one or more storage devices. Furthermore, the present invention comprises a system and method for dynamically disabling a parallel mode on the coordinating DBMSs and the assisting DBMSs.

30 Claims, 14 Drawing Sheets

Query Parallelism

Shared Data DBMS System

Exemplary Computer System

Query Parallelism

Query Parallelism

Step 500

Control Flow Diagram
of Binding a Query

Step 506

Control Flow Diagram
of Running a Query

Control Flow Diagram of
Originating DBMS at Bind Time

Control Flow Diagram of Originating DBMS at Run Time

Control Flow Diagram of Processing
Parallel Plan on Originating DBMS

Control Flow Diagram of Originating
DBMS Running a Plan

Control Flow Diagram of
Processing Workfile Data

Control Flow Diagram of Assisting DBMs at Run Time

Bufferpool Allocation Thresholds

Global Compatible Class Locking

Bufferpool Coherency for Workfile Data

QUERY PARALLELISM IN A SHARED DATA DBMS SYSTEM

TECHNICAL FIELD

This invention relates to relational databases, and more specifically to a shared data DBMS system comprising multiple database management systems (DBMSs) and a single copy of the data. This invention decomposes long-running, complex queries into a plurality of parallel tasks allocated across the DBMSs of a shared data DBMS system.

BACKGROUND ART

1. Query Parallelism

Database management systems (DBMSs) have become a central resource for conducting and maintaining a successful enterprise. As enterprises expand, data processing needs increase and can quickly exceed the capacity of a single DBMS. Therefore, enterprises have a growing need to efficiently combine, manage, access, and utilize multiple DBMSs within a single database complex.

A database complex comprises multiple DBMSs accessing data on multiple storage devices. A data storage device is typically a disk such as a direct access storage device (DASD). Each DBMS executes on a central processor complex (CPC). A CPC is a computer system including one or more processors (CP). Each CPC of a database system may comprise the same configuration and number of processors, or each CPC may be unique.

Prior to database complexes having the capability to share data, there were limited options available to an enterprise for increasing its data processing capabilities of a single DBMS. First, an enterprise could use one or more DBMSs to supplement the existing DBMS. There was no communication between the DBMSs and no shared DBMS catalog and directory of the data. This approach required the enterprise to maintain separate DBMSs and data. This approach increased management costs because there were multiple separate systems. In one variation of this scheme, each DBMS would manage some applications and copies of some data. In a second variation of this scheme, the applications and data were logically divided among the DBMSs. Each DBMS managed separate applications and data. For example, one DBMS and data could be dedicated to employee records, whereas a second DBMS and data could be dedicated to payroll. These two DBMS did not share data and there were no copies of data. A disadvantage of separate DBMS systems was that the workload could not be balanced at peak usage.

Second, an enterprise could use a second DBMS for which it would rewrite applications to access the original data on the first DBMS as distributed data. This approach relieved the workload on the original DBMS, but required modifications to the applications and incurred performance overhead on the second DBMS. This approach, however, is still the only option available to an enterprise if the DBMSs are separated by a great distance, or if the DBMSs need to share data with a system outside the database complex.

Third, an enterprise can replace the existing processor with a larger one. The data and applications are then moved from the old slower processor to the new faster processor. This is an expensive option and is often the choice of last resort. Not only is this a costly solution, but the DBMS must come down while the transfer is taking place.

There are four contemporary data models used to implement a database complex that shares data: distributed, partitioned, shared disk, and shared data. A typical distributed data DBMS system has multiple DBMSs and data residing in multiple physical locations. There is only one copy of the data. For example, one DBMS and its data would be located in New York City, N.Y., a second DBMS and data located in San Francisco, Calif., and a third DBMS and data located in London, England. The data at each location is unique and is not replicated at the other locations. The DBMSs are linked together providing for the sharing of the data. When one DBMS requires data from a remote DBMS, the requesting DBMS must interface with the remote DBMS to access the needed data. Therefore, there is a time delay for remote data access because some standard communication protocol is usually used. In addition, the distributed data DBMS system is limited by a single point of failure. If one DBMS is unavailable, then that DBMS's data is unavailable and the remaining DBMSs are unable to access that data.

A partitioned data DBMS system, commonly referred to as shared nothing data system, is typically implemented in a single location with multiple DBMSs, each running on a separate CPC, in which there is a one-to-one relationship between a DBMS and a segment of the data. Each DBMS owns a specific data segment and has sole responsibility for physical access to that data segment. A communication system links all of the DBMSs to ensure that a request for data is routed to the correct DBMS that owns the needed data.

A shared disk data DBMS system comprises multiple DBMSs and storage devices such that each DBMS has direct access to each storage device through an I/O subsystem interface. When one DBMS requires data from a specific storage device, the DBMSs typically coordinate their processing of and access to the data with some sort of message passing.

A shared data DBMS system is identical to the shared disk data DBMS system, but has the added feature of a coupling facility. The coupling facility represents shared memory accessible by each DBMS in the system. It allows for simple communication as the shared memory can be used for synchronization of the DBMSs. The DBMSs access the coupling facility as a means to interface with the other CPCs, and DBMSs, in the shared data DBMS system. The coupling facility further provides the means to do high speed global locking and inter-DBMS caching to preserve data integrity in a multi-DBMS environment, thereby greatly reducing the speed of inter-DBMS communication.

The shared data DBMS system has several important performance advantages over both the distributed and partitioned data DBMS systems. The first advantage pertains to balancing the workload across the DBMSs in the system. A database complex is balanced when each CPC has the same workload and is operating at approximately the same utilization levels. This results in the system as a whole operating at an optimal level. In contrast, both the distributed and partitioned data DBMS systems only achieve a balanced workload when the system administrator tunes the system. A system administrator tunes a computer system through scheduling applications, setting application priorities and resource utilization thresholds, and allocating resources. When a system administrator tunes a distributed or partitioned data system, the workload can be evenly balanced across all of the DBMSs in the system because the workload is known. During real time, however, the system is often not tuned because the system administrator cannot anticipate the workload. The workload is unevenly balanced across all of the DBMSs because the access to one segment of the data may not be as active as the access to another data segment.

Therefore, one DBMS of a distributed or partitioned data DBMS system may receive more data requests than another resulting in that DBMS operating at higher utilization levels.

In the shared data DBMS system, however, the workload remains balanced across the DBMSs regardless of whether or not the system administrator tuned the system. The balanced workload occurs because each DBMS can directly access each data segment through the I/O subsystem interface and does not rely on another DBMS for access.

The second performance issue pertains to the management of incremental growth. In the distributed and partitioned data DBMS systems, a new DBMS and storage device must be added together. If the new DBMS cannot handle all of the processing of the data on the new storage device, the data is redistributed to one or more other storage devices which in turn redistributes some of 0 the workload to the other DBMSs. In the shared data DBMS system, a new DBMS or storage device can be easily added at any time. There is no need to reconfigure the entire system. The changes only have to be made to the coupling facility and the I/O subsystem interface which can be accomplished without outage on the existing DBMS.

The third performance issue pertains to the availability of a DBMS. When a DBMS in a database complex fails or is otherwise unavailable, the remaining DBMSs must compensate for the loss. In a distributed data DBMS system, the remaining DBMSs cannot compensate for the loss because they cannot access the storage device that is directly connected to the unavailable DBMS. The distributed data DBMS system operates with a single point of failure. In a partitioned data DBMS system, a second DBMS connects to the storage device of the unavailable DBMS and takes over its workload. The second DBMS's workload increases because it is now supporting its own data and the data of the failed DBMS. In a shared data DBMS system with an unavailable DBMS, however, the system continues to execute uninterrupted with a balanced workload. The remaining DBMSs continue to have direct access to all storage devices through the I/O subsystem interface.

An important feature of a database complex, regardless of its data model, is the ability of the complex to exploit all resources within the complex. For example, through query parallelism, a DBMS divides the processing of an application's query into parallel tasks and allocates those tasks to one or more DBMSs in the complex. A DBMS receives a query from an application's task, thereby becoming an originating DBMS. The application's task is the originating task. There are several ways in which the originating DBMS can execute the query. The query can be sequentially processed by the originating DBMS on the current single CPC, processed in parallel by the originating DBMS on the current single CPC, or processed in parallel by more than one DBMS across the multiple CPCs in the database complex. The chosen mode of execution for the query depends on its complexity and resource requirements.

A problem arises when an originating DBMS in a database complex receives a long-running, complex query. Long running queries include I/O intensive queries, such as tablespace scans and large index scans, CP intensive queries, such as joins, sorts, and complex expressions, and complex data analysis, such as data mining or decision support. It is difficult to receive an answer for a complex query in a reasonable amount of time because the query must traverse large volumes of data which may take hours or days to complete. Thus, the greatest bottleneck for long running queries is the time needed to get the data from the storage device. Additionally, if the originating DBMS processes such a query in parallel on the current single CPC, there is a performance issue. The single CPC parallel processing is limited to the capacity of the current CPC. Once that capacity has been exceeded, a bottleneck is generated thereby reducing the DBMS performance.

One solution to the bottleneck problem is a database complex using the shared disk data model. This solution, however, has a performance disadvantage in that message passing between the DBMSs is too time consuming and can take up to milliseconds per message transfer.

An alternative solution to the bottleneck problem is a database complex using a shared read-only data model. Under this approach, one DBMS owns the common, shared data. This owning DBMS has read-write access to the shared data while the other DBMSs in the complex only have read access to the shared data. Whenever the owning DBMS writes data, the other DBMSs are denied access to the shared data until the write is complete. This solution requires the DBMS to switch from read-write access to read-only access. Additionally, each DBMS in a shared read-only data model requires its own data catalog and directory. Therefore, object definitions are replicated in each DBMS and operational procedures must exist to manage the replicated objects.

Therefore, there is a need for a shared data DBMS system comprising multiple DBMSs capable of decomposing a long-running query into multiple parallel tasks and allocating the parallel tasks across the multiple DBMSs.

2. Selective Disabling of Parallel Modes

Contemporary multiple DBMS database complexes typically use three types of parallel modes: I/O parallelism, single CPC parallelism, and multi-CPC parallelism. The I/O parallelism mode allows multiple prefetch I/O streams to overlap CP operations. Thus, the I/O devices do not have to wait while the CP is processing previously read data. In the single CPC parallelism mode, a DBMS concurrently executes multiple parallel tasks on the host CPC. In the multi-CPC parallelism mode, a DBMS concurrently executes multiple parallel tasks across all of the available DBMSs in the shared data system.

As database complexes become larger and more complex, users require the capability of disabling one or more modes of parallelism at the system level. For example, if a DBMS in a database complex was operating at a high CP utilization rate such as 95% or higher, single CPC parallelism would probably not be beneficial because of the associated overhead. I/O parallelism, however, would be beneficial to the system to avoid the increased CP utilization. Therefore, in this example, a system administrator would want to disable single CPC parallelism and enable I/O parallelism.

Contemporary multiple DBMS database complexes provide a granular mechanism for disabling parallel modes. The mechanism is available at both the query level and the system level. At the query level, the application developer decides in the source code at the point of a query whether to disable a parallel mode. The query parameters contain the disable switch. The disadvantage of this implementation, however, is that the system does not offer any flexibility after the application containing the query has been written. Running with parallelism may be beneficial for the query at certain times, but not beneficial at other times. The chosen parallelism switch could be completely inappropriate during the execution of the query. At the system level, these contemporary systems provide a global switch to disable a parallel mode. The global switch is a system-wide global parameter that applies to all applications and queries executing within the system. This system level mechanism is also unresponsive to the dynamics of the system at run time.

Therefore, there is a need for a dynamic mechanism providing selective disablement of the different modes of parallelism within a shared data DBMS system.

3. Bufferpool Coherency for Workfile Data

One of the advantages of multiple DBMS database complexes is the use of multi-CPC parallelism during which the DBMSs exchange results. In a typical scenario, a consuming DBMS needs to access the results generated by a producing DBMS for further processing. The producing DBMS produces the results, writes the results to a shared memory location, such as a DASD, and then notifies the consuming DBMS to read the results.

One method of returning results from a producing DBMS to a consuming DBMS is in a workfile. A workfile is a temporary storage area that contains intermediate results. Contemporary multiple DBMS database systems treat workfiles as an active sharing space to which each DBMS in the complex has read-write access. Consuming DBMSs, however, do not require write access to these workfiles because they only have to retrieve the results. This unnecessary write access creates additional overhead in the managing table space.

Therefore, there is a need for a consuming DBMS in a shared data DBMS system to only have read access to a producing DBMS's workfile. There is a further need for the producing DBMSs to write the workfile to a storage device without impairing the non-multi-CPC work executing on the producing DBMS. There is still a further need to ensure that a consuming DBMS accesses current workfiles without generating any unnecessary memory accesses.

DISCLOSURE OF INVENTION

1. Query Parallelism

The present invention of query parallelism solves the current problem of a shared data DBMS system having multiple DBMSs in which each DBMS decomposes a large, data intensive query into multiple parallel tasks and allocates the parallel tasks across the DBMSs. The present invention is directed to a shared data DBMS system comprising multiple DBMSs each of which has direct access to data stored on multiple storage devices. Each DBMS does not have to communicate through another DBMS to access data. Each DBMS is further capable of decomposing a long-running, complex query into multiple parallel tasks. Each parallel task represents a sub-query that is a different part of the original query, such that the aggregate of all the parallel tasks is the original query. The parallel tasks are allocated across the available DBMSs in the complex. The DBMSs process the query concurrently with no two DBMSs processing the same part of a query and only minimal contentions for data access. This scheme of processing is multi-CPC query parallelism. All system resources and CP processing power are exploited resulting in a reduced elapse time for processing the query.

FIG. 1 shows a shared data DBMS system 100 of the present invention in which multiple DBMSs 104a–104n, located on separate CPCs 102a–102n, are connected to multiple storage devices 108a–108x by an I/O subsystem interface 106. A storage device is typically a DASD. Each DBMS 104a–104n has read-write access to each storage device 108a–108x without having to go through another DBMS. Each DBMS is further connected to a coupling facility 110. The coupling facility 110 is shared memory providing a high speed means of DBMS/CPC communication. In the shared data DBMS system, there is no need to manage copies or distribute data. Additionally, there is one copy of the metadata used by all of the DBMSs. Metadata is a repository of information that describes the data housed in a DBMS.

In the present invention of a shared data DBMS system operating query parallelism, an originating DBMS receives a query from a user application. After determining that the query is a good candidate for parallel processing across multiple CPCs, the originating DBMS decomposes the query into multiple parallel tasks and derives a plan allocating those parallel tasks to the available DBMSs in the system. When executing multi-CPC query parallelism, the originating DBMS becomes a coordinating DBMS while the remaining DBMSs in the system become assisting DBMSs. An assisting DBMS is a DBMS that is available and has the capacity to accept and execute at least one parallel task from the coordinating DBMS. The coordinating DBMS sends the plan to all assisting DBMSs in the shared data system.

Each assisting DBMS concurrently executes its assigned parallel tasks and returns results back to the originating DBMS as the results are generated. The results may be returned via one of two methods: 1) by the cross-system coupling facility (XCF) links which return actual data rows through the coupling facility or over channel-to-channel links interconnecting the CPCs, or 2) in workfiles.

The present invention provides an inbound and outbound control for determining how to allocate the parallel tasks of a decomposed query. These controls are used to regulate the workload balanced on the DBMSs of the system. The outbound control dictates whether an originating DBMS is enabled to execute multi-CPC query parallelism and assign parallel tasks to assisting DBMSs. When disabled, the outbound control forces an originating DBMS to process the query locally on a single CPC. In contrast, an assisting DBMS uses an inbound control to limit the amount of support allocated to other coordinating DBMSs. The inbound control provides an assisting DBMS with a mechanism for setting a threshold of how much query parallelism work will be accepted. When fully disabled, the inbound control dedicates an assisting DBMS to perform only local work and ensures that performance is not impacted by outside requests.

In addition to the inbound and outbound controls, an optimizer in the originating DBMS performs a cost-based analysis in determining how to decompose a query. If a query requires access to a partitioned table space, a table located in separate storage devices, then it becomes a candidate for parallelism. The optimizer next determines the processor cost and input/output (I/O) cost for this query and calculates an optimum degree of parallelism while balancing these costs. The optimum degree is the number of parallel tasks into which the query is decomposed.

There are numerous advantages and features of multi-CPC query parallelism in a shared data DBMS system. First, query parallelism decomposes a long running query into multiple parallel tasks which are then executed across multiple-CPCs. This scheme greatly reduces the elapsed time of such a query than if the query was executed on a single-CPC. Second, query parallelism in a shared data DBMS environment is not adversely affected when a DBMS in the system becomes unavailable due to planned or unplanned circumstances. The query decomposition exploits the surviving DBMSs in the complex and allocates the parallel tasks accordingly. Third, the present invention minimizes system overhead and thrashing by limiting the amount of parallelism in the system via the optimal degree and refinement of the optimal degree at run-time.

2. Selective Disabling of Parallel Modes

The present invention further solves the problem of dynamically disabling one or more modes of parallelism at the system level without the need to reconfigure the originating DBMS. The present invention includes a dynamic mechanism providing selective disablement of the different modes of parallelism within a shared data DBMS system. The mechanism allows a system administrator to dynamically respond to system utilization levels by selectively disabling parallel modes.

The present invention uses a resource limit specification table (RLST) in which a system administrator maintains a profile of applications. A profile includes identifying characteristics of each plan as well as a function value specifying a disabled parallel mode. One profile is active at a time. When a profile is active, each profile entry controls whether a specific parallel mode is disabled during that plan's execution. The system administrator creates multiple profiles each of which invokes a varying set of restrictions. The profiles can provide time of day control where a specific profile can be activated at a specific time of the day. For example, during the hours of 8 am and 5 pm when the database complex is most heavily utilized, the system administrator may want to disable certain parallel modes such as single CPC parallelism or multi-CPC parallelism which carry a higher CP overhead and only allow I/O parallelism. After 5 pm, however, the system administrator may enable all parallel modes.

The profile further provides a dynamic mechanism for responding to system utilization changes. When the system characteristics change, the system administrator may activate a specific profile that adjusts an application's execution to those system changes. For example, if the CPC was operating at 98% utilization, the system administrator may decide to disable single and multi-CPC parallelism and allow only I/O parallelism. If such an adjustment was not made, a query response would most likely take longer than normal due to the higher CP overhead associated with CPC parallelism.

3. Bufferpool Coherency for Workfile Data

The present invention further solves the problem of reducing workfile overhead in a shared data DBMS system by providing a consuming DBMS read-only access to a producing DBMS's workfile. The present invention includes a system and method for a consuming DBMS in a shared data DBMS system to only have read access to a producing DBMS's workfile. By avoiding unnecessary write accesses, overhead of managing the workfile is saved. Each DBMS can be either a consuming or producing DBMS of the workfile. The invention enables a producing DBMS to write a workfile to a storage device without impairing the non-multi-CPC work executing on the producing DBMS. The invention ensures that a consuming DBMS accesses current workfiles without generating any unnecessary storage device accesses.

The present invention allocates a set of workfiles to each DBMS in the system. Bufferpool coherency mechanisms ensure that a workfile is written to a storage device without impacting the non-multi-CPC work and with ensuring that the consuming DBMS accesses the current workfile data.

A producing DBMS marks each multi-CPC workfile data page with a unique token in a descriptor area in local memory. Then, when the workfile is complete, the producing DBMS flushes all of its page buffers whose descriptor contain the unique token and writes those pages to disk. This procedure forces the pages of a specific workfile to a storage device and disregards all non-multi-CPC workfile pages and all unrelated multi-CPC parallelism work.

An alternative and easier implementation than using a unique token is to use a single bit flag in the descriptor indicating that the workfile page is involved in a multiple-CPC task. This implementation, however, fails when there is more than one multi-CPC parallel task executing on the producing DBMS. For example, if there are two such parallel tasks, when the first one completes, it would cause the workfile pages of both parallel tasks to be written to a storage device. Therefore, one parallel task may incur the cost of writing another query's workfile data pages.

A second alternative to the use of unique tokens requires the producing DBMS to automatically write a workfile data page to a storage device after every modification. This implementation has a high cost and low performance. It is more efficient and cost effective to defer writing and perform batch writes.

Bufferpool coherency mechanisms also ensure that the consuming DBMS contains the current workfile. When a producing DBMS creates a workfile, it generates a unique time stamp specific for that workfile. Therefore, if a producing DBMS is executing multiple parallel tasks as a result of query parallelism, each workfile gets a unique timestamp. The timestamp is written to each page of its associated workfile when the pages are flushed from the producing DBMS buffer to the storage device. After the file is written to the storage device, the producing DBMS sends the workfile timestamp to the consuming DBMS in a notify message. The message indicates to the consuming DBMS that the workfile is ready for reading. When the consuming DBMS requests a workfile page it first looks to see if that page is in its bufferpool. If it is and the timestamp on a page equals the unique timestamp, then the consuming DBMS knows not to re-read the page from the storage device, thereby saving I/O time. If, however, the timestamp is not the same, then the consuming DBMS must re-read the workfile from the storage device into its bufferpool.

The consuming DBMS may have read the desired workfile page with the unique timestamp into its bufferpool prior to receiving the producing DBMS's notify message by a sequential pre-fetch operation. A second application executing on the consuming DBMS may have issued a read from the storage device. The read operation may have included a pre-fetch operation which pulled extra pages into the consuming DBMS's bufferpool in anticipation of future reads. The desired workfile pages may be included in these extra pre-fetched pages. Thus, by checking the timestamp on the pages already in the buffer, the consuming DBMS eliminates the need to read from the storage device and saves significant I/O time.

Additional features of this invention will become apparent from the following detailed description of the best mode for carrying out the invention and from appended claims.

BRIEF DESCRIPTION OF DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

BEST MODE FOR CARRYING OUT THE INVENTION

1. System Architecture

Figure 1:
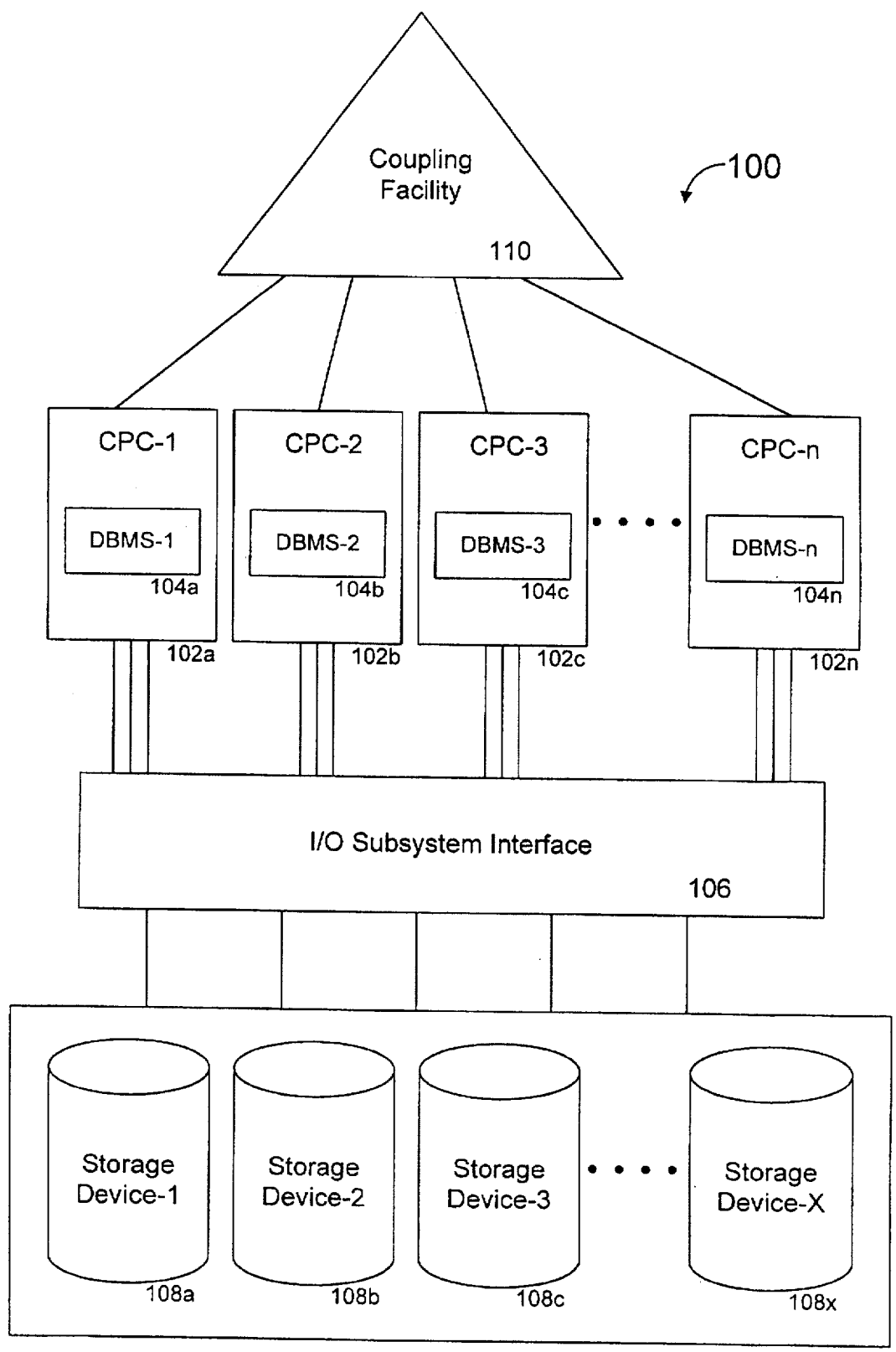
FIG. 1 is a block diagram showing a shared data DBMS system according to a preferred embodiment of the present invention.

The present invention is directed to a shared data DBMS system in which multiple DBMSs are coupled to multiple storage devices. FIG. 1 illustrates a shared data DBMS system 100 according to a preferred embodiment of the present invention. Each DBMS 104a–104n preferably executes on a separate central processing complex (CPC) 102a–102n. A coupling facility 110 is a separate CPC connected to each CPC 102a–102n via a high speed link such as fiber optical cable. The coupling facility 110 allows for communication and synchronization of the DBMSs 104a–104n by managing data requests and providing a locking manager. An I/O subsystem interface 106 provides a direct interface between each DBMS 104a–104n and each storage device 108a–108x. A storage device 108a–108x is typically a DASD.

The shared data DBMS system is described in detail in U.S. Pat. No. 5,408,653, titled Efficient database access using a shared electronic store in a multi-system environment with shared disks, issued Apr. 18, 1995 from application Ser. No. 07/869,267 filed Apr. 15, 1992, incorporated herein by reference in its entirety.

Any of the following hardware units or other appropriate units can be used as a coupling facility 110: System 390 Coupling Facility model 9674, System 390 Parallel Transaction Server model 9674, System 390 9021 711-Based Water-Cooled models, and System 390 9021 511-Based Air-Cooled model when the processor enables this model as a coupling facility emulator. These coupling facilities are available from International Business Machines Corporation (IBM) and described in the IBM document S/390 *Parallel Reference Guide*, G326-0416, which is incorporated herein by reference in its entirety.

Figure 2:
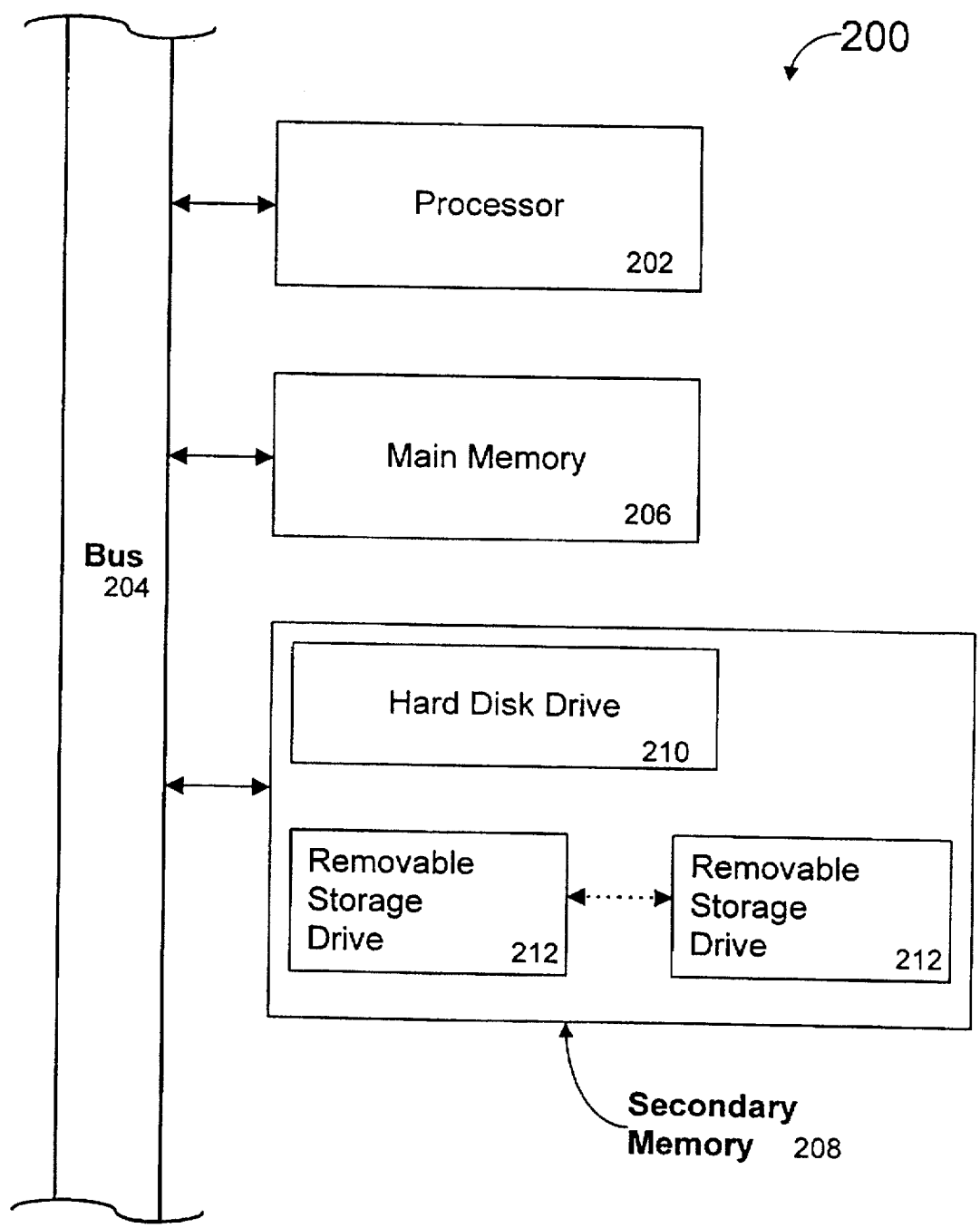
FIG. 2 is a block diagram showing an exemplary computer system useful for implementing a CPC.

A CPC 102a–102n is a logical computer system including one or more processors. An exemplary CPC 200 is shown in FIG. 2. The CPC 200 includes one or more processors, such as processor 202. The processor 202 is connected to a communication bus 204.

The CPC 200 also includes a main memory 206, preferably random access memory (RAM), and a secondary memory 208. The secondary memory 208 includes, for example, a hard disk drive 2210 and/or a removable storage drive 212, representing a floppy disk drive, a magnetic tape drive, a compact disk drive, etc. The removable storage drive 212 reads from and/or writes to a removable storage unit 214 in a well known manner.

Removable storage unit 214, also called a program storage device or a computer program product, represents a floppy disk, magnetic tape, compact disk, etc. As will be appreciated, the removable storage unit 214 includes a computer usable storage medium having stored therein computer software and/or data.

Computer programs (also called computer control logic) are stored in main memory 206 and/or the secondary memory 208. Such computer programs, when executed, enable the CPC 200 to perform 20 the features of the present invention as discussed herein. In particular, the computer programs, when executed, enable the processor 202 to perform the features of the present invention. Accordingly, such computer programs represent controllers of the CPC 200.

In another embodiment, the invention is directed to a computer program product comprising a computer readable medium having control logic (computer software) stored therein. The control logic, when executed by the processor 202, causes the processor 202 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of a CPC 102 of the present invention is one that can function in a multi-CPC environment. Examples of a CPC 102 used in the present invention are: System 390 Parallel Transaction Server model 9672, System 390 9021 711-Based Water-Cooled models, and System 390 9021 511-Based Air-Cooled Frame Mounted models. These CPCs are available from International Business Machines Corporation (IBM) and described in the IBM document S/390 *Parallel Reference Guide*, G326-0416, which is incorporated herein by reference in its entirety.

The present invention is described in terms of a computer program executing within a CPC 200. Description in these terms is provided for convenience only. It is not intended that the invention be limited to application in this example environment. In fact, after reading the following description, it will become apparent to a person skilled in the relevant art how to implement the invention in alternative environments.

2. Overview of Multi-CPC Query Parallelism

Figure 3:
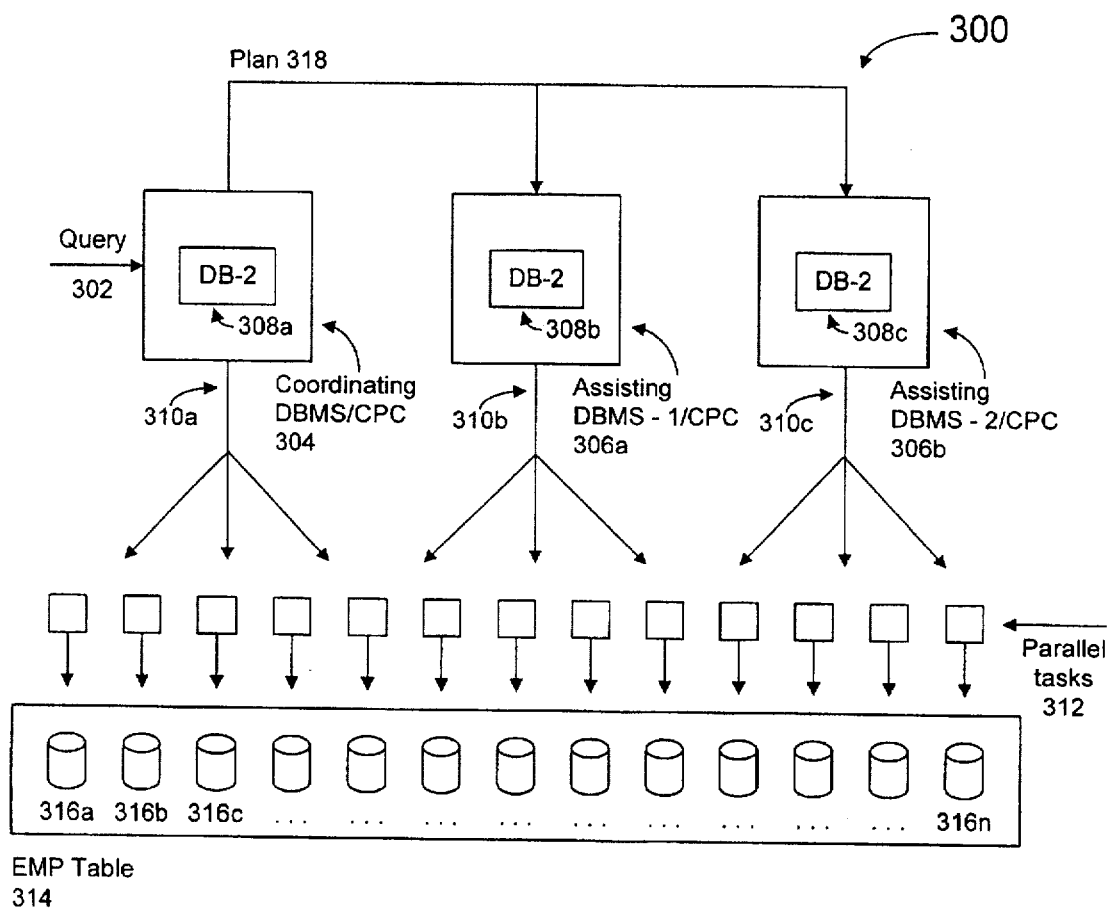
FIG. 3 is a block diagram showing query parallelism receiving a query from a user application and decomposing the query into multiple parallel tasks.
Figure 4:
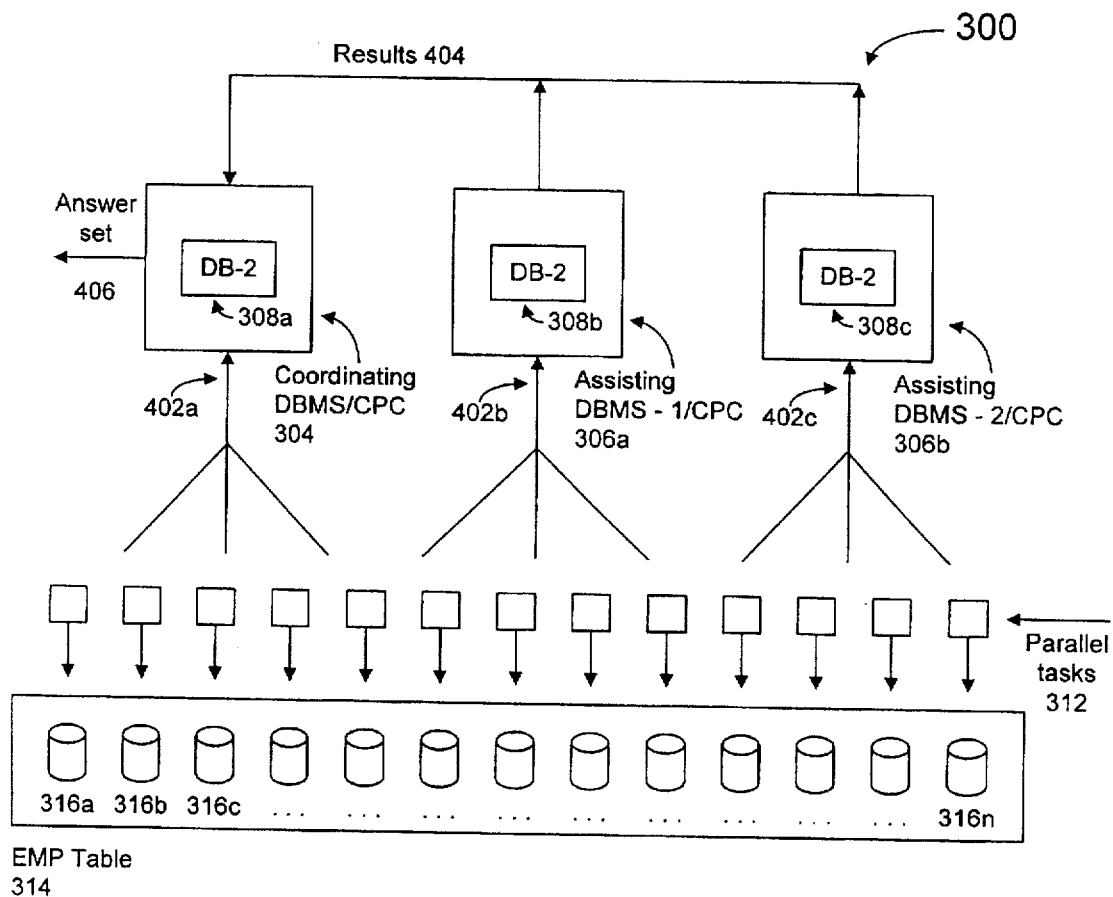
FIG. 4 is a block diagram showing query parallelism returning an answer set to a user application.

FIGS. 3 and 4 describe multi-CPC query parallelism according to the present invention. FIG. 3 shows a shared data DBMS system 300 comprising multiple DBMSs/CPCs 304, 306a, 306b. The shared data DBMS system 300 further includes an employee table 314 comprised of multiple storage devices 316a–316n. The employee table 314 is an example of a relational database table directly accessible by each DBMS/CPC 304, 306a, 306b.

The database management system DB2 308a–308c for MVS/ESA executes on each CPC 304, 306a, 306b. Multiple Virtual Storage/Enterprise System Architecture (MVS/ESA) is the operating system for the IBM System 390 architecture. DB2 for MVS/ESA is currently available from IBM and pertinent aspects of DB2 are described in many publicly available documents, such as *IBM Database 2 Version 3 General Information*, GC26-4886, First Edition March 1993, and *IBM Database 2Version 4: What's New in DB2?*, GC26-8206, 1994, which are incorporated herein by reference in their entireties. It should be understood that the invention is described with reference to DB2 for convenience purpose only. Other DBMSs could alternatively be used.

In operation, a user application generates a query 302. The query 302 is sent to and received by a DBMS, in this case, DBMS 304. The DBMS that receives a query 302 is called the originating DBMS. If the query 302 is suitable for multi-CPC query parallelism, then the originating DBMS is further called a coordinating DBMS. Therefore, in this case, DBMS 304 is called a coordinating DBMS. The coordinating DBMS 304 decomposes the query for parallel processing and develops a parallel plan 318 for multi-CPCs. The coordinating DBMS 304 transmits the plan 318 to all available DBMSs 306a–306b in the system 30. The DBMSs in the system supporting the coordinating DBMS are called the assisting DBMSs 306a–306b. The plan 318 decomposes the query 302 into multiple parallel tasks 312. Each DBMS 304, 306a, 306b executes the parallel tasks 312 that the coordinating DBMS 304 assigns to it. The parallel tasks 312 access the data on the storage devices 316a–316n during execution.

FIG. 4 illustrates the shared data DBMS system 300 after the parallel tasks 312 have completed. The DBMSs 304, 306a, 306b read and process 402a–402c the data from the storage devices 316a–316n. The assisting DBMSs 306a–306b return the results 404 of the parallel tasks 312 to the coordinating DBMS 304. The coordinating DBMS 304 performs the final processing of the results and returns an answer set 406 to the user application.

Future references to FIGS. 3 and 4 will reference DBMS 304 as both an originating DBMS 304 and a coordinating DBMS 304 depending on the type of parallelism.

3. High Level Control Flow of Query Parallelism

Figure 5A:
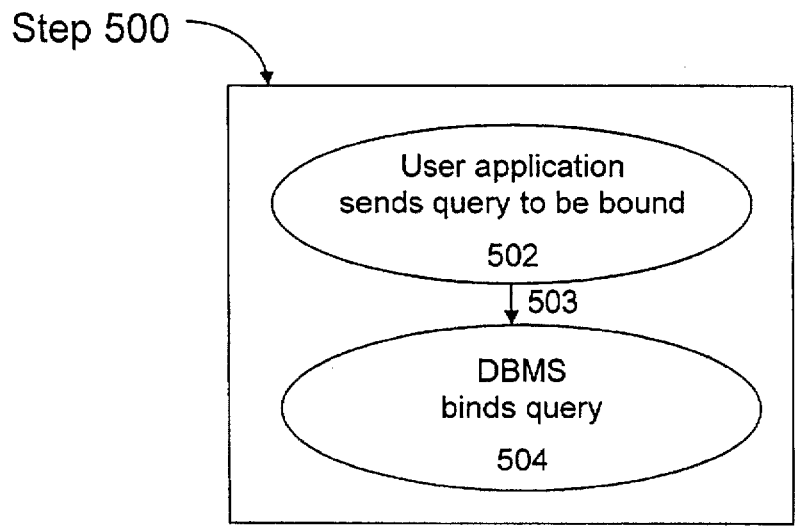
FIGS. 5A and 5B collectively illustrate a control flow diagram showing the overview of query parallelism.
Figure 5B:
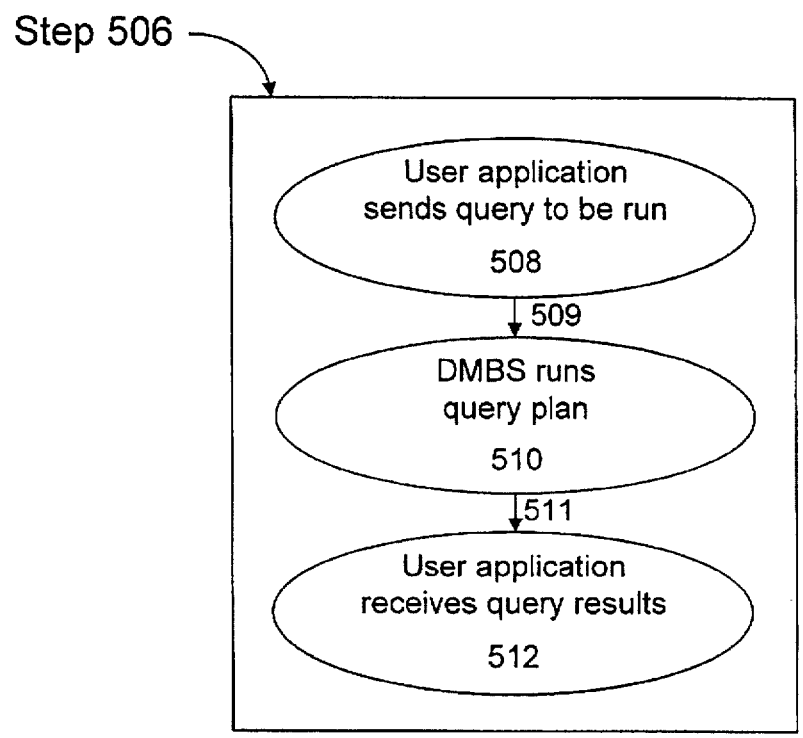

The high level control flow of the present invention is illustrated in FIGS. 5A and 5B. Multi-CPC query parallelism is preferably a two step process such that a query 302 must be bound prior to being run.

Referring to FIGS. 5A, 5B and 3, in step 500, binding takes place wherein a query 302 is decomposed and a plan 318 is developed to process the decomposed query. In step 506, the plan 318 is executed to thereby process the query 302. The manner in which steps 500 and 506 are performed shall now be described.

In step 500, a user application binds a query 302. Specifically, in step 502, the user application sends the query 302 to an originating DBMS 304 of a shared data DBMS system 300 for binding. In step 504, the originating DBMS 304 binds the query 302 thereby creating a plan 318 for executing the query 302.

In step 506, the user application runs a bound query. Specifically, in step 508, the user application sends the query 302 to the originating DBMS 304 a second time. In step 510, the originating DBMS 304 runs the query 302 based on the plan 318 developed in step 500 at bind time. After the originating DBMS 304 completes the query 302, it returns the results back to the user application in the form of an answer set 406 in step 512.

The preferred embodiment of the present invention is a two step process (steps 500 and 506) as described above. This embodiment enables a user application to bind a query one time and repetitively run that query against changed data. There is no need to rebind a query if it does not change. The query, however, does have to be rebound if the tablespace is repartitioned. By not requiring a query to be rebound every time it is run, the user application saves the elapsed time required for binding.

The present invention is not limited to the two step process, but is described only in terms of the preferred embodiment. Persons skilled in the relevant arts would be able to develop alternative methods for eliminating the need for repetitive binding of a query.

4. Bind Time

Figure 6:
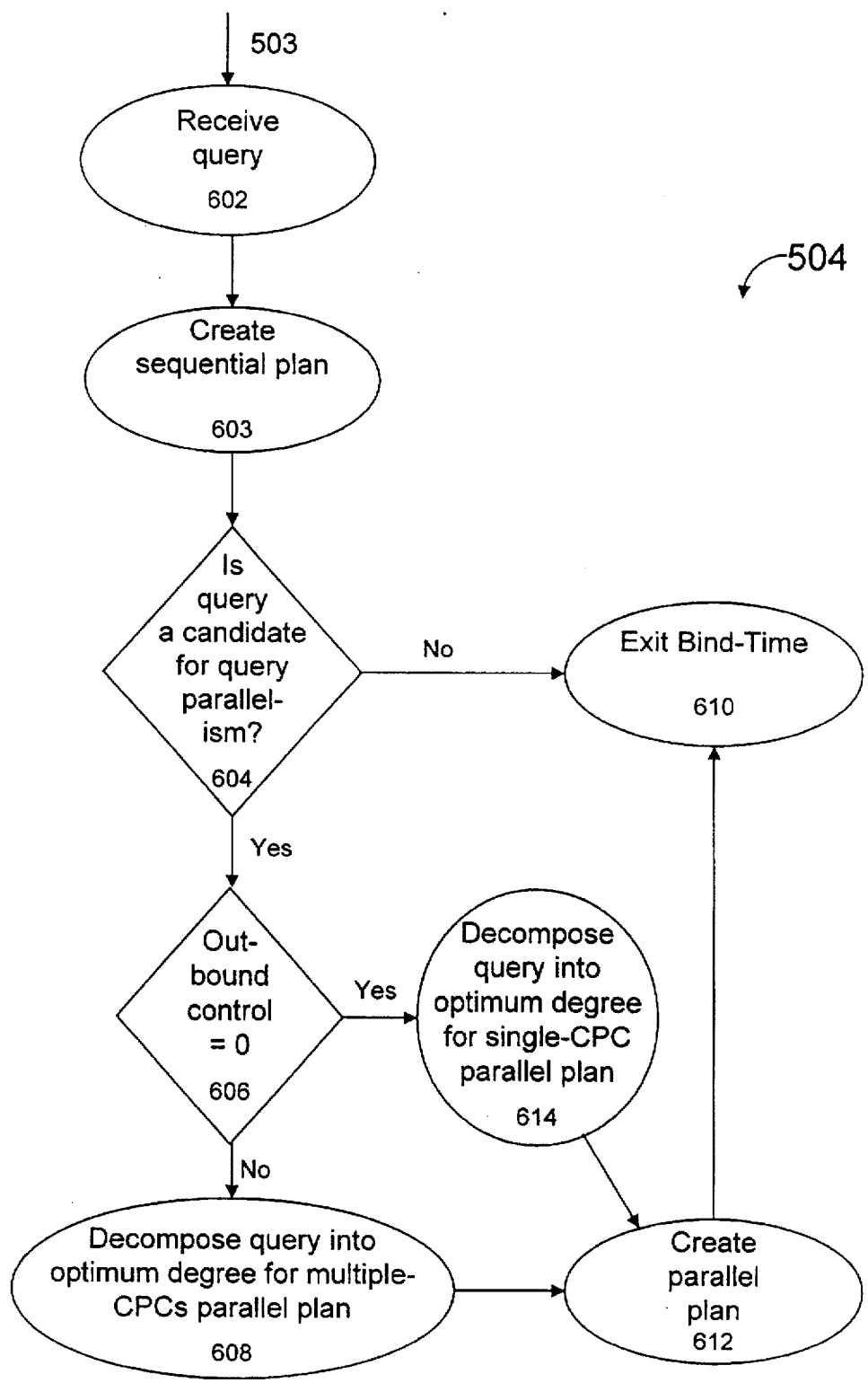
FIG. 6 is a control flow diagram showing an originating DBMS at bind time.

The operation of the originating DBMS 304 during bind time (i.e. step 504) is represented by a control flow diagram in FIG. 6. In step 602, the originating DBMS 304 receives the query 302 from a user application. In step 603, the originating DBMS 304 creates a sequential plan 318 for the query 302. A sequential plan 318 comprises one task that executes on the single host CPC and is always created as a default measure. Continuing to step 604, the originating DBMS 304 determines whether the query 302 is a candidate for query parallelism. The determination is based on an analysis of the CP cost and the I/O cost for running the query 302. The originating DBMS 304 only considers parallelism for a query 302 requiring access to partitioned tablespaces. The data in a partitioned tablespace is located in separate physical storage devices. If the query 302 does not require access to partitioned tablespaces, it is determined in step 604 that the originating DBMS 304 proceeds to step 610 and exits the binding step 504.

If it is determined in step 604 that the query 302 requires access to partitioned tablespaces thereby being a candidate for query parallelism, then the originating DBMS 304 in step 606 checks its outbound control. A system administrator sets an outbound control for each DBMS 304, 306a, 306b in the shared data DBMS system 300. The outbound control is a YES/NO switch that dictates whether or not a DBMS 304, 306a, 306b is authorized to allocate parallel tasks 312 to the other DBMSs in the shared data DBMS system 300. If in step 604 the system administrator had set the outbound control to NO, the originating DBMS 304 is disabled from multi-CPC parallelism and must process the query 302 on the single host CPC. The query 302, however, is still a candidate for parallelism, but for parallelism on a single CPC. Therefore, in step 614, the optimizer decomposes the query 302 into an optimum degree of parallel tasks for a single CPC. After the optimum degree is determined in step 614, the originating DBMS 304 creates a parallel plan 318 in step 612.

In step 606, if the system administrator had set the outbound control for the originating DBMS 304 to YES, the originating DBMS 304 is authorized to perform multi-CPC query parallelism. In step 608, the optimizer decomposes the query 302 into an optimum degree of parallel tasks for multi-CPCs. After the optimizer determines the optimum degree in step 608, a parallel plan 318 is created in step 612.

After creating either a single CPC or multi-CPC parallel plan 318 in step 612, the originating DBMS 304 exits the binding step 504.

Query parallelism uses logical partitioning to decompose a query 302 into multiple parallel tasks 312. Logical partitions are designated page ranges for a tablespace scan or key ranges for an index scan. Such partitions may, but do not exclusively, coincide with the physical partitions of the storage devices. Each logical partition is associated with one parallel task 312. The optimizer obtains partition information from the catalog statistics provided by RUNSTATS.

RUNSTATS is a DB2 utility that analyzes the tablespace data and index data contained on the DASDs. RUNSTATS generates statistics on the data tables concerning data organization and location. The RUNSTATS utility should be executed prior to a user application binding and running a query 302. The optimizer cannot optimally bind a query 302 without current tablespace and index statistics. If RUNSTATS is not executed against a tablespace, query parallelism is not possible and the query 302 will be executed sequentially. The present invention is not limited to the use of RUNSTATS, but rather, the present invention would execute regardless of how the tablespace statistics were derived. It would be apparent to persons skilled in the relevant arts to develop alternative methods for deriving statistics on data and index organizations.

Logical partitioning provides the flexibility to choose the optimal number of parallel data streams or parallel tasks 312 for the query 302. In addition, logical partitions can be adjusted based on resource utilization. If the system is currently overloaded with parallel tasks 312, the number of tasks for the query 302 can be downgraded. For the purpose of example, assume a tablespace has ten (10) evenly balanced partitions, the I/O cost to read each partition is five (5) seconds, the processing costs for the entire query is forty (40) seconds, and the system is configured with four (4) processors. Under these circumstances, the elapsed time allocated to processing cannot be reduced below ten (10) seconds. Therefore, choosing a degree greater than four (4) will not reduce the elapsed time even though the partitions could be read more quickly. A higher degree increases the overhead of the extra parallel tasks.

5. Originating DBMS at Run Time

Figure 7:
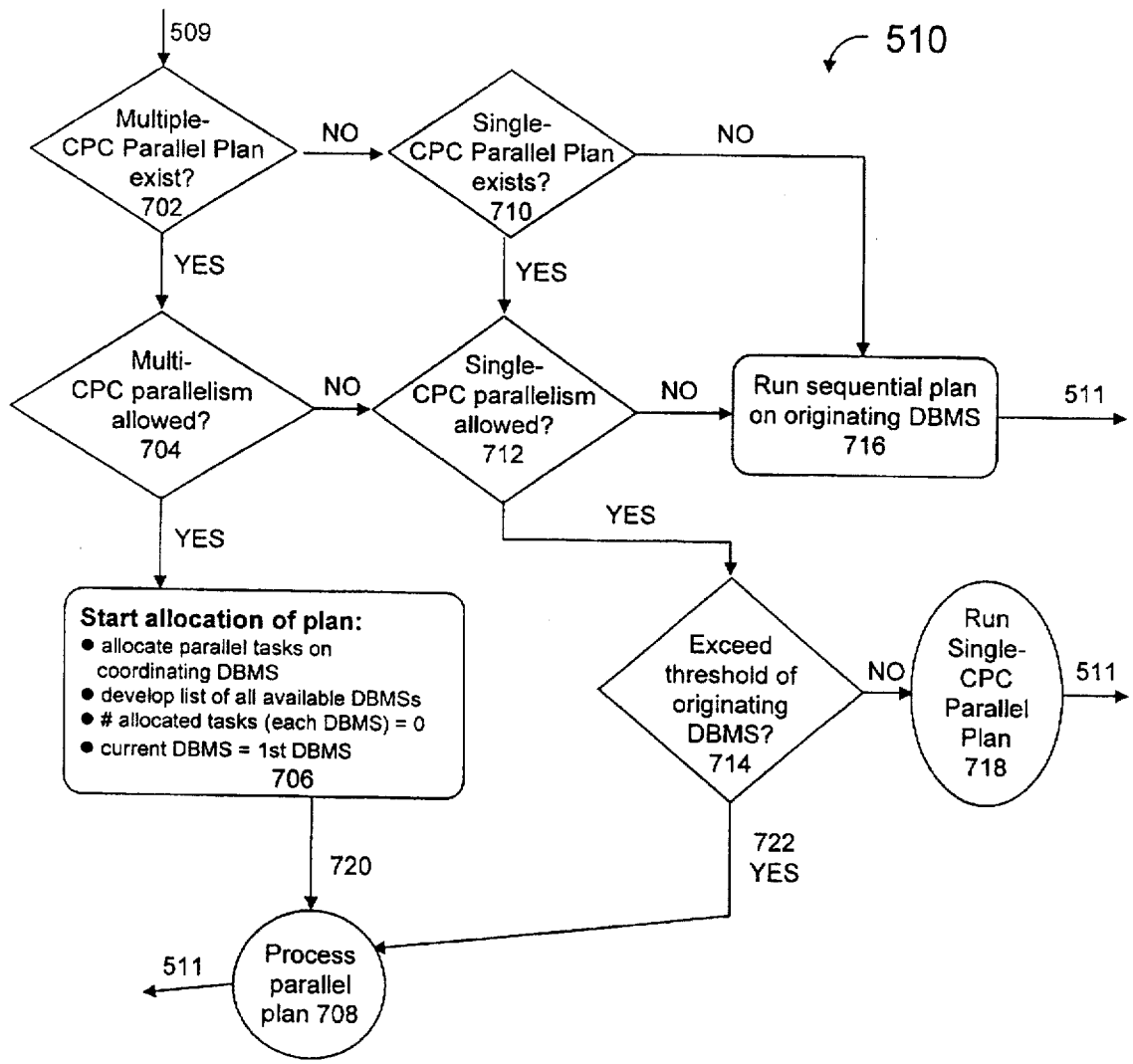
FIG. 7 is a control flow diagram showing an originating DBMS at run time.

The operation of the originating DBMS 304 during run time (i.e. step 510) is represented by a control flow diagram in FIG. 7. In Step 702, the originating DBMS 304 first determines if a multi-CPC parallel plan 318 exists for the given query 302. If the plan 318 does not exist, the originating DBMS 304 proceeds to step 710. In step 710, the originating DBMS 304 determines if a single CPC parallel plan 318 exists for the given query 302. If not, then the query 302 must not have been a candidate for parallelism. In step 716, the originating DBMS 304 executes the sequential plan 318 for the query 302. When the plan 318 is complete, the originating DBMS 304 proceeds from step 716 to step 512 and returns the query results 404 in the form of an answer set 406 to the user application.

Referring again to step 710, if a single CPC parallel plan 318 does exist, the originating DBMS 304 proceeds to step 712. In step 712, the originating DBMS 304 determines whether or not the single host CPC is enabled to execute single CPC parallelism. This determination is made by accessing the function value field for the current plan 318 in the active RLST profile. If the function value disables single CPC parallelism, the originating DBMS 304 is not authorized to execute parallel tasks 312. The originating DBMS 304 proceeds to step 716 where it executes the sequential plan 318 for the given query 302. In step 716, when the sequential plan 318 is complete, the originating DBMS 304 proceeds to step 512 and returns the query results 404 as an answer set 406 to the user application in step 720.

The present invention uses a resource limit specification table (RLST) to maintain system profiles. Table 1 illustrates an example of a system profile.

TABLE 1

| RLF-FUNC | AUTHID | LUNAME | PLAN-NAME | RLF-COLLN | RLF-PKG |
| --- | --- | --- | --- | --- | --- |
| 5 | QMFUSER | | QMF | | |
| 3 | HACKER | | | | |

TABLE 1-continued

| RLF-FUNC | AUTHID | LUNAME | PLAN-NAME | RLF-COLLN | RLF-PKG |
| --- | --- | --- | --- | --- | --- |
| 4 | HACKER | | | | |
| 5 | HACKER | | | | |

In table 1, a user application is organized by a location name (LUNAME), plan name (PLANNAME), collection name (RLFCOLLN), and a package name (RLFPKG). Application profiles and the RLST are currently available from IBM and pertinent aspects of profiles and the RLST are described in many publicly available documents, such as *IBM Database 2Version 3General Information*, GC26-4886, First Edition March 1993, and *IBM Database 2Version 4: What's New in DB2?*, GC26-8206, 1994, which are incorporated herein by reference in their entireties.

In table 1, RLFFUNC is the function value representing when a parallel mode is disabled. The value 5 disables multi-CPC parallelism; the value 4 disables single CPC parallelism; and the value 3 disables I/O parallelism. The remaining function values also relate to query parallelism, but do not disable parallel modes. The value 2 prevents binding of queries; and the value 1 timeouts a run-away query. The present invention uses the integer values for convenience only. It would be apparent to a person skilled in the relevant art to develop other representations for disabling a parallel mode.

Returning to FIG. 7 and referring again to step 712, if the originating DBMS 304 is enabled for single CPC parallelism, the originating DBMS 304 proceeds to step 714. In step 714, the originating DBMS 304 determines whether it has the capacity for local parallel processing. If the current utilization of the originating DBMS 304 does not exceed a threshold value, the originating DBMS 304 can perform parallel processing on the single CPC and enters step 718. When all parallel processing is complete, the originating DBMS returns to step 512 and returns the query results 404 to the user application. In step 714, however, if the current CP utilization exceeds the threshold value, the originating DBMS 304 refines the parallel plan 318 in step 708. In step 708, a new degree of parallelism is developed such that the originating DBMS 304 has the capacity to execute the new single CPC parallel plan 318. Further details on allocating thresholds and step 708 are provided below.

Referring again to step 702, if a multi-CPC plan 318 does exist for the given query 302, the originating DBMS 304 determines in step 704 whether or not it is authorized to execute multi-CPC parallelism. In step 704, the originating DBMS 304 accesses the function value field for the current plan 318 in the active RLST profile. If the function value disables multi-CPC parallelism, the originating DBMS 304 cannot allocate parallel tasks 312 across the DBMSs 304, 306a, 306b of the shared data DBMS system 300. In step 704, if the originating DBMS 304 determines that multi-CPC parallelism is disabled, the originating DBMS 304 proceeds to step 712. In step 712, the originating DBMS 304 determines whether single CPC parallelism is disabled. From step 712 in the control flow, the originating DBMS 304 follows the same processing paths as described above for single CPC parallelism.

Referring again to step 704, if the originating DBMS 304 is enabled to execute multi-CPC parallelism, the originating DBMS 304 proceeds to step 706. In step 706, the originating DBMS 304 starts allocating the parallel tasks 312 of the multi-CPC parallel plan 318 to the DBMSs 304, 306a, 306b in the shared data DBMS system 300. The number of parallel tasks 312 to be allocated is the optimum degree derived by the original DBMS 304 at bind time in step 500.

Prior to the actual allocation of parallel tasks 312, the originating DBMS 304 performs initialization in step 706. First, the originating DBMS 304 allocates the maximum number of parallel tasks 312 to itself. The allocation accounts for the local CPC's current and threshold utilization levels. Second, the originating DBMS 304 develops a list of all available DBMSs 306a, 306b in the shared data DBMS system 300. These available DBMSs are assisting DBMSs 306a, 306b and the originating DBMS 304 becomes the coordinating DBMS 304. The now coordinating DBMS 304 initializes a number-of-allocated-tasks counter for each DBMS 304, 306a, 306b. This counter represents the number of parallel tasks allocated 312 to each DBMS 304, 306a, 306b in the shared data DBMS system 300. The counter for the coordinating DBMS 304 is set equal to the number of parallel tasks 312 previously assigned. The counter for the assisting DBMSs 306a, 306b is set to zero. The originating DBMS 304 also sets a pointer representing the current-DBMS to the first assisting DBMS 306a in the list of available DBMSs 306a, 306b. This current-DBMS counter will loop through the list of all available assisting DBMSs 306a, 306b until all of the parallel tasks 312 have been allocated or until none of the available assisting DBMSs 306a, 306b can accept another parallel task 312. After the initialization is complete in step 706, the coordinating DBMS 304 processes the parallel plan 318 in step 708. Further details on allocation thresholds and step 708 are provided below.

This embodiment of the present invention represents a fill-and-spill approach in that the coordinating DBMS 304 is "filled" first by allocating to itself the maximum number of parallel tasks 312 that it can execute. Afterwhich, the remaining parallel tasks 312 are "spilled" to the assisting DBMSs 306a, 306b in a round-robin approach. In the round-robin approach, the present invention loops through the assisting DBMSs 306a, 306b one at a time assigning a parallel task 312 whenever the current DBMS can accept it. This looping continues until all of the parallel tasks 312 have been allocated or none of the assisting DBMS 306a, 306b can accept another parallel task 312.

An example of the fill-and-spill approach is as follows: Assume a multi-CPC parallel plan has an optimal degree of 16. Therefore, there are 16 parallel tasks that need to be allocated. Further assume that the coordinating DBMS can accept 10 parallel tasks and there are 3 assisting DBMSs. The coordinating DBMS loops through the list of assisting DBMSs until the optimum degree is achieved or none of the assisting DBMSs can accept another parallel task. One scenario may look as follows:

Coordinating DBMS takes 10;
Assisting DBMS #1 takes 1;
Assisting DBMS #2 takes 1;
Assisting DBMS #3 takes 1;
Assisting DBMS #1 takes another, total=2;
Assisting DBMS #2 takes another, total=2;
Assisting DBMS #3 exceeds threshold, total=1;
Assisting DBMS #1 takes another, total=3;
Optimal degree achieved at 16 parallel tasks.

The final result of the above spill-and-fill approach is that the coordinating DBMS takes 10 parallel tasks, assisting DBMS #1 takes 3 parallel tasks, assisting DBMS #2 takes 2 parallel tasks, and assisting DBMS #3 takes 1 parallel task.

Figure 7A:
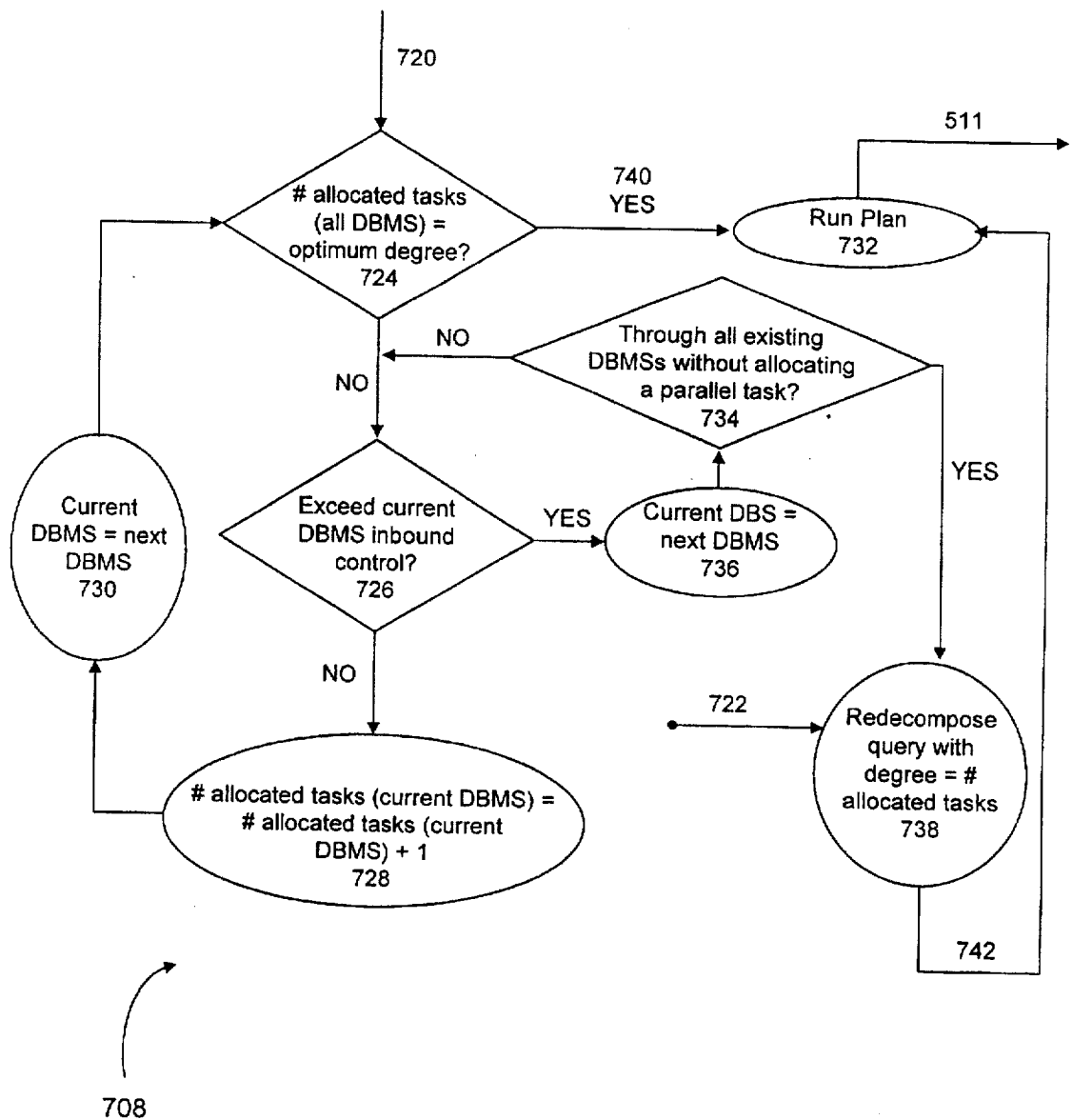
FIG. 7A is a control flow diagram showing the processing of a parallel plan on an originating DBMS.

FIG. 7A illustrates the fill-and-spill approach described above in general terms. The initialization for the fill-and-spill approach is handled in step 706. In step 706, the coordinating DBMS 304 allocates to itself the maximum number of parallel tasks 312 that the local host CPC can handle. In step 724, the coordinating DBMS 304 next determines whether it has allocated the optimal degree of parallel tasks 312. If the optimal degree has been allocated, then the coordinating DBMS 304 goes to step 732 and runs the multi-CPC parallel plan 318.

In step 724, if the optimal degree has not been allocated, the coordinating DBMS 304 advances to step 726 and analyzes the current-DBMS's inbound control. The coordinating DBMS 304 determines whether the current-DBMS can accept a parallel task 312 for execution. In step 726, if the current-DBMS's inbound control threshold would be exceeded by allocating a parallel task 12, the coordinating DBMS 304 executes step 736 and advances the current-DBMS pointer to the next available assisting DBMS 306a, 306b. In step 734, the coordinating DBMS 304 determines if all of the assisting DBMSs 306a, 306b are unable to accept a parallel task 312. In step 734, if there is at least one assisting DBMS 306a, 306b that accepted a parallel task 312 in the last round, the coordinating DBMS 304 returns to step 726 to analyze the new current-DBMS's inbound control.

Referring again to step 726, if the current-DBMS has the capacity to accept a parallel task 312, the coordinating DBMS 304 proceeds to step 728. In step 728, the coordinating DBMS 304 increments the number-of-allocated-tasks counter for the current-DBMS by one. Next, in step 730, the current-DBMS pointer is advanced to the next assisting DBMS 306a, 306b. From step 730, the coordinating DBMS 304 returns to step 724 to determine if all of the parallel tasks 312 have been allocated across the DBMSs 304, 306a, 306b in the shared data DBMS system 300.

Referring again to step 734, if all of the DBMSs 304, 306a, 306b in the shared data DBMS system 300 are filled to capacity and cannot accept another parallel task 312 and unallocated parallel tasks 312 remain, the coordinating DBMS 304 must refine the parallel plan 318 in step 738. In step 738, the coordinating DBMS 304 redecomposes the query 302 into the number of parallel tasks 312 that the DBMSs 304, 306a, 306b in the shared data DBMS system 300 are capable of accepting. After the new plan is developed in step 738, the coordinating DBMS 304 runs the plan 318 for the query 302 in step 732.

The originating DBMS 304 can also enter step 738, which redecomposes a parallel plan 318, from step 714. For this control flow, DBMS 304 is an originating DBMS and not a coordinating DBMS because at step 714 the plan is a single CPC parallel plan, not a multi-CPC parallel plan. In step 714, the originating DBMS 304 determines that a single CPC parallel plan 318 cannot execute on the single host CPC due to the optimal degree exceeding the single host CPC's capacity. In this case, the originating DBMS 304 executes step 738 to redecompose the query 302 into the number of parallel tasks 312 that it can process. After the new plan 318 is developed, the originating DBMS 304 proceeds to step 732 and runs the new plan 318.

An alternative embodiment of allocating parallel tasks across the DBMSs 304, 306a, 306b in a shared data DBMS system 300 is a forced-spill approach. The forced-spill approach does not "fill" the coordinating DBMS 304 prior to allocating the remaining parallel tasks 312 in a round-robin method. The coordinating DBMS 304 enters itself as an available DBMS 304, 306a, 306b for accepting parallel tasks 312 and participates in the round-robin allocation.

More specifically, in step 706, the coordinating DBMS 304 eliminates the initial allocation of parallel tasks 312 to itself. The coordinating DBMS 304 assigns itself a number-of-allocated-tasks counter with an initial value of zero. The coordinating DBMS 304 further includes itself in the list of available DBMSs 304, 306a, 306b that can participate in accepting parallel tasks 312. Then, in step 708, the coordinating DBMS 304 participates in the round-robin allocation with the assisting DBMSs 306a, 306b.

The forced-spill approach has the benefit of always distributing the workload of a long running query 302. The fill-and-spill approach maximizes the coordinating DBMS's 304 utilization. Therefore, under fill-and-spill, if the coordinating DBMS 304 received a second resource intensive query 302, the coordinating DBMS 304 could become overloaded. The forced-spill approach, however, results in a more balanced workload across the DBMSs 304, 306a 306b. This maximizing of parallelism is beneficial because the workload on any DBMS 304, 306a, 306b cannot be predicted at any one time.

Referring again to step 708, the present invention automatically analyzes each query 302 to determine the benefit of executing multi-CPC query parallelism. If, for example, a query 302 is a candidate for query parallelism, but it is a relatively short query 302, such that its elapsed time is less than an elapsed time threshold, for example ten (10) seconds, then there is no benefit to distributing the workload across multiple CPCs 304, 306a, 306b. The overhead of multi-CPC parallelism would outweigh any benefit. If, however, a query 302 would take longer to process than the elapsed time threshold, multi-CPC query parallelism would be executed on the query 302. Each DBMS has a default elapsed time threshold and furthermore, system administrators can dynamically set the elapsed time threshold.

6. Originating DBMS processing results at Run Time

Figure 8:
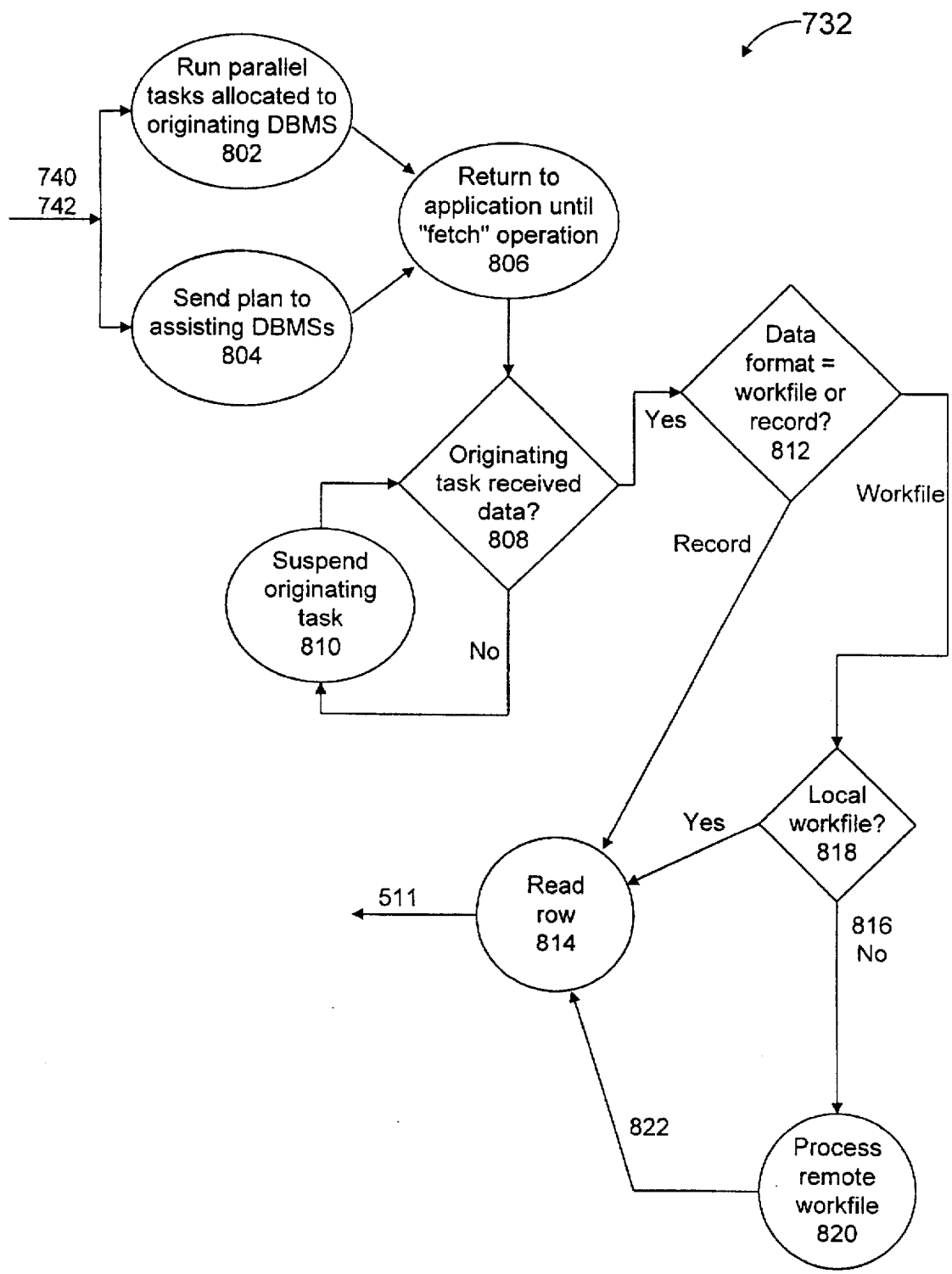
FIG. 8 is a control flow diagram showing an originating DBMS processing query results as received by parallel tasks.

The operation of the originating DBMS 304 receiving and processing results from parallel tasks 312 during run time (i.e. step 732) is represented by a control flow diagram in FIG. 8. More specifically, the control flow diagram in FIG. 8 represents the originating DBMS 304 running the plan 318 in step 732. In Step 802, the originating DBMS 304 spawns the parallel tasks 312, if any, that it allocated to itself. The spawning of the parallel tasks 312 allocated to the originating DBMS 304 is shown on FIG. 3 at item 310a.

In step 804, the originating DBMS 304 sends the plan 318 to each assisting DBMS 306a, 306b only if parallel tasks 312 have been assigned to an assisting DBMS 306a, 306b. The present invention sends one plan 318 to each assisting DBMSs 306a, 306b for each parallel task 312. Therefore, if one assisting DBMS 306a, 306b is assigned three (3) parallel tasks 312, then the originating DBMS sends three plans 318 to that assisting DBMS 306a, 306b. There is a cost advantage associated with this approach in that there is less overhead building the plan 318 in one place on the originating DBMS 304.

The plan 318 includes the query 302, its decomposition into multiple parallel tasks 312, and the assignment of the parallel tasks 312 to each DBMS 304, 306a, 306b in the shared data DBMS system 300. Each assisting DBMS 306a, 306b spawns the parallel tasks 312, if any, assigned to it. The spawning of the parallel tasks 312 allocated to the assisting DBMSs 306a, 306b is also shown on FIG. 3 at items 310b, 310c and on FIG. 9 in step 904.

The preferred embodiment of the present invention implements the multiple parallel tasks spawned from an originating DB2 304 or assisting DB2 306a, 306b in the shared data database system 300 as preemptable system request blocks (SRBs). SRBs are typically used for short running system operations. DB2 handles synchronization through suspending and resuming the parallel tasks. Preemptable SRBs allow for time-slicing of the parallel tasks and also inherit the priority of the application's address space. Preemptable SRBs are available on the IBM System 390 operating under MVS/ESA version 5.2 and pertinent aspects of preemptable SRBs are described in many publicly available documents, such as *MVS/ESA System Product, Programming: Authorized Assembler Services Guide*, Document Number GC28-1467-01, Second Edition, June 1995, available from IBM.

After the DBMSs 304, 306a, 306b spawn the parallel tasks 312 in steps 802 and 804, the originating DBMS 304 proceeds to step 806. In step 806, the originating DBMS 304 returns control to the user application until the application reaches a DBMS "fetch" operation. A fetch operation is a database command indicating that the application requests a row of data.

In step 808, the originating task waits for results 404 from any parallel task 312. If the originating task does not receive results 404 from any parallel task 312, it proceeds to step 810 and suspends itself. In step 808, the originating task wakes up from suspension when results 404 from any parallel task 312 are returned and proceeds to step 812. In step 812, the originating task determines the format of the results received from a parallel task 312.

Parallel tasks 312 return their results 404 to the originating DBMS 304 in one of two methods: (1) by the cross-system coupling facility (XCF) or, (2) in workfiles. Results that contain actual data rows are returned via XCF links. The data rows are transmitted either through the coupling facility 110 or over channel-to-channel links that interconnect the CPCs 102a–102n. A workfile is a temporary file produced by a parallel task 312 and written to a storage device 316. In general, results 404 are transmitted in workfiles when the resulting data rows need to be sorted. When a parallel task 312 completes its processing, it writes the results 404 in the appropriate format, then sends a notify message to the originating task indicating that the results 404 are available.

Referring again to step 812, the originating task on the originating DBMS 304 determines whether the recently received results are stored in a workfile or a record. If the results are in a record format, the originating task proceeds to step 814. In step 814, the originating task reads a row of data. The originating task returns the row of data to the user application.

Referring again to step 812, if the results 404 are in a workfile, the originating task proceeds to step 818. In step 818, the originating task determines if the workfile is local to the originating DBMS 304 or if the workfile belongs to the assisting DBMS 306a, 306b. If the workfile is local, the originating task already has access to the results on the storage device 316a–316n. Therefore, from step 818, the originating task continues to step 814 in which the originating task reads a row of data. The originating task returns the row of data to the user application.

Referring again to step 818, if the workfile is not local, the originating task proceeds to step 820 to process the remote workfile. After the originating task processes the remote workfile, it continues from step 820 to step 814. In step 814, the originating task reads a row of data. The originating task returns the row of data to the user application.

Figure 8A:
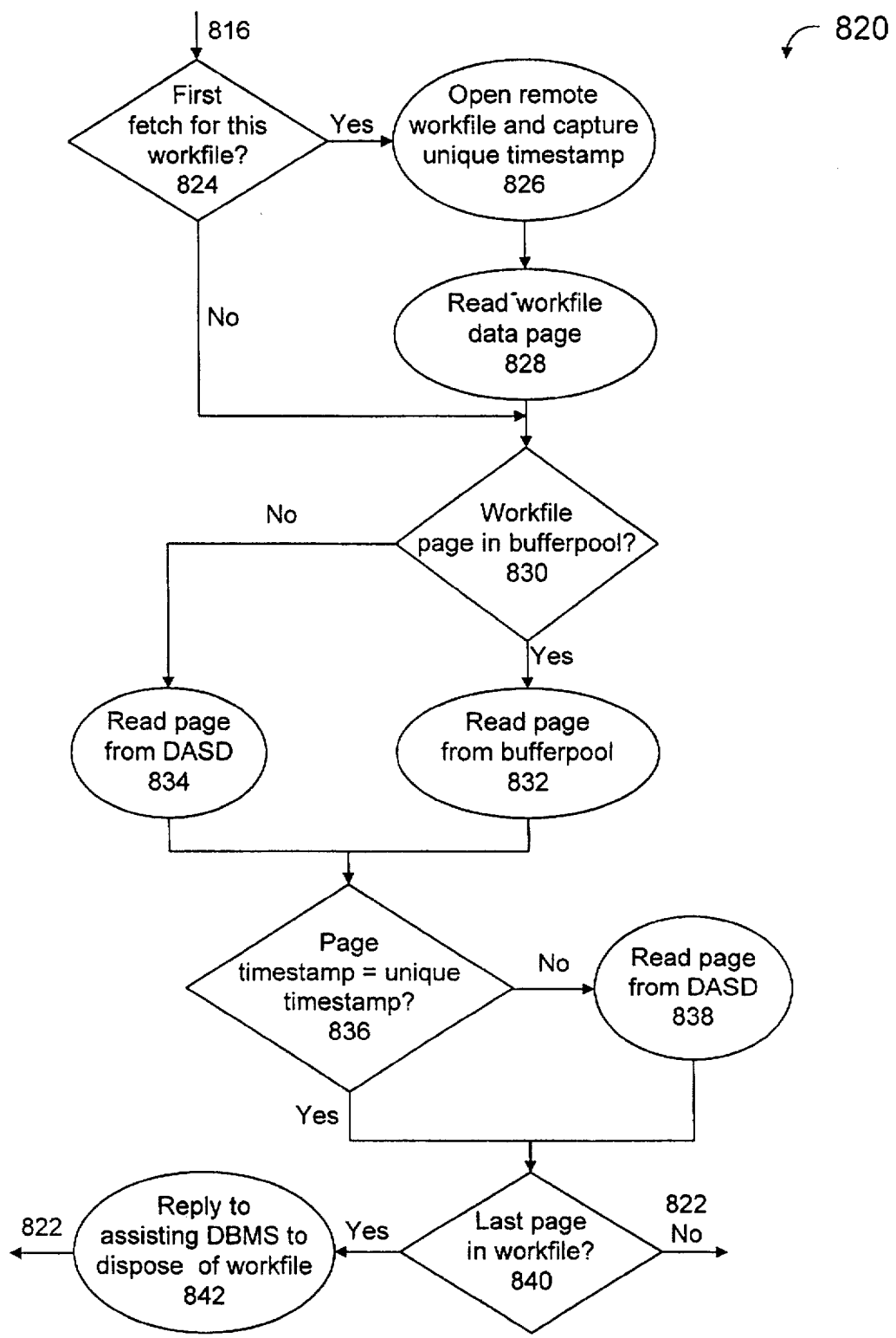
FIG. 8A is a control flow diagram of an originating task processing workfile data.

FIG. 8A illustrates the control flow of step 820 which processes remote workfile data. Upon receiving a request for a row of data from a remote work file in step 818, the originating task enters step 824. In step 824, the originating task determines if this is the first fetch request for that workfile. If it is the first fetch request, the originating task proceeds to step 826. In step 826, the originating task retrieves information about the workfile from a notify message. The parallel task 312 that produced the workfile sends a notify message to the originating task on the originating DBMS 304 indicating that the workfile is available. The notify message includes the workfile location, size, and unique timestamp. The timestamp is a unique eight (8) byte identifier written in every page of the workfile. After retrieving information about the workfile, the originating task proceeds to step 828.

In step 828, the originating task reads the location of the first page from the workfile. Next, in step 830, the originating task determines whether the current workfile page is located in the bufferpool of the originating DBMS 304 or located on a storage device 316. A bufferpool is a cache-type memory of a CPC which is used by the DBMSs 304, 306a, 306b. If the current workfile page is located in the bufferpool, then step 830 proceeds to step 832. In step 832, the originating task reads the current workfile page from the bufferpool location. If in step 830, however, the current workfile page is located on the storage device 316, the originating task proceeds to step 834 and reads the current workfile page from the storage device 316. In the preferred embodiment of the present invention, the storage devices 316a–316n are DASDs.

After the originating task has read the current workfile page in either step 834 or 832, it proceeds to step 836. In step 836, the originating task compares the unique timestamp retrieved from the notify message with the timestamp written to the workfile page. If the two timestamps match, the originating task proceeds to step 840. If in step 836 the two timestamps do not match, the originating task knows that it does not have the most recent copy of the current workfile page in its bufferpool. The originating task goes to step 838 in which it reads the current workfile page from the storage device 316. After steps 836 and 838, the originating task has the most recent workfile page and proceeds to step 840.

In step 840, the originating task determines if there are any more pages in the current workfile. If there are more pages to read, the originating task proceeds to step 814 where it reads a row of data from the workfile data page and sends the data to the user application. If in step 840 there are no more pages to read in the current workfile, the originating task continues to step 842. In step 842, the originating task sends a reply message to the assisting DBMS 306a, 306b that produced the workfile. The reply message notifies the assisting DBMS 306a, 306b that the originating DBMS 304 processed the results 404 in the workfile. After sending the reply message in step 842, the originating task proceeds to step 814 where it reads the row of data from the workfile data page and sends the data to the user application.

7. Parallel Tasks at Run Time

Figure 9:
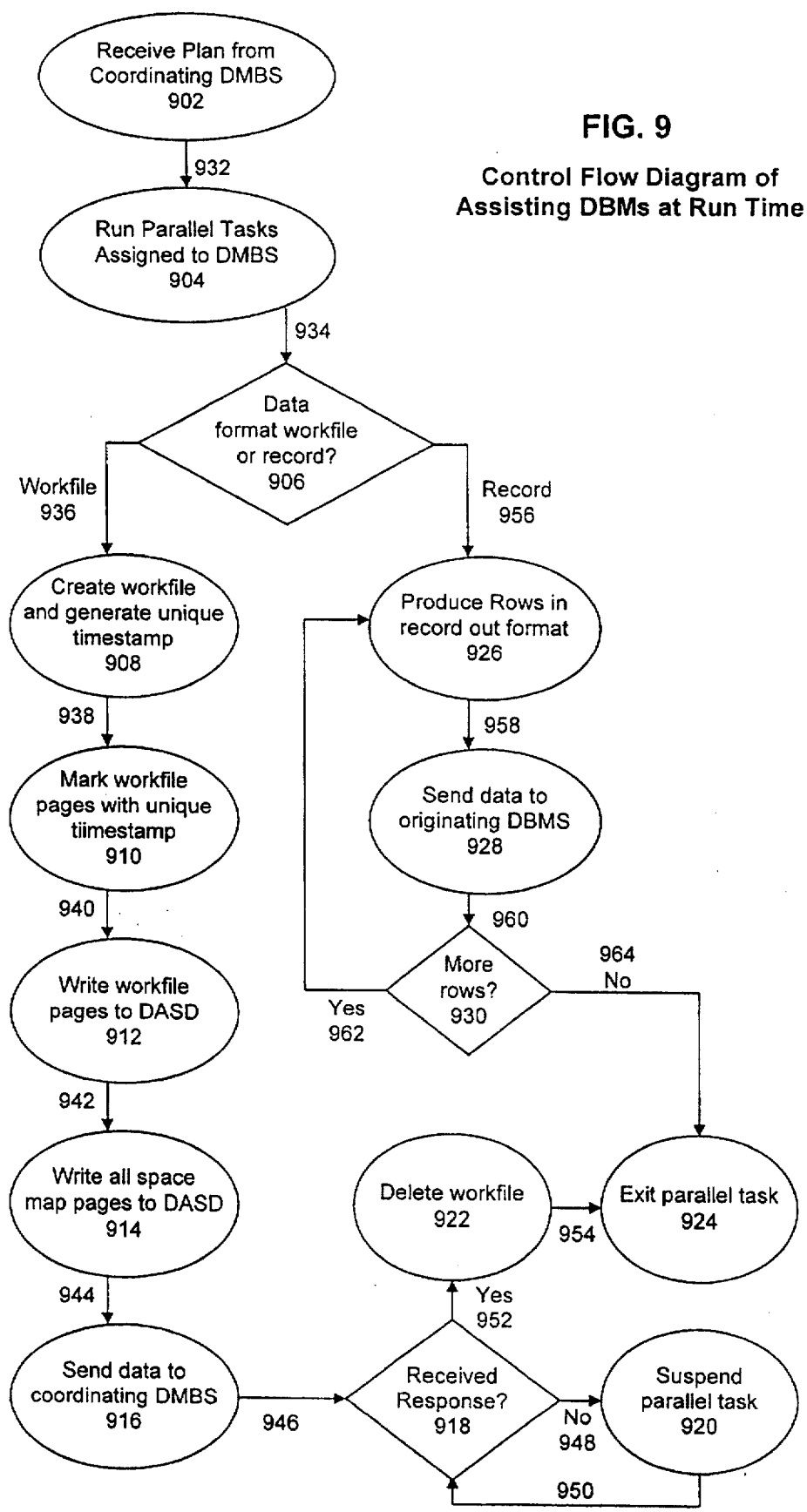
FIG. 9 is a control flow diagram showing an assisting DBMS at run time.

The operation of an assisting DBMS 306a, 306b during run time (i.e. step 510) is represented by a control flow diagram in FIG. 9. In step 902, an assisting DBMS 306a, 306b is activated for multi-CPC query parallelism when it receives a plan 318 from a coordinating DBMS 304. After receiving the plan 318 in step 902, the assisting DBMS 306a, 306b enters step 904 in which it spawns the parallel tasks 312 which were assigned to that assisting DBMS 306a, 306b. While each assigned parallel task 312 executes on the assisting DBMS 306a, 306b, the parallel task 312 enters step 906 to begin producing the results 404.

If, in step 906, the parallel task 312 determines that the results 404 are to be returned to the coordinating DBMS 304 in a workfile, the parallel task 312 advances to step 908. In step 908, the parallel task 312 creates a new workfile and generates a unique timestamp. In step 910, as the parallel task 312 produces results 404 and writes the results 404 to the workfile, the parallel task 312 marks the workfile pages with the unique timestamp. This timestamp is used as an identifier for the originating DBMS 304 to ensure that the coordinating DBMS 304 accesses the most recent workfile data. Further details regarding bufferpool coherency is provided below.

When the parallel task 312 has completed executing, it continues to step 912. In step 912, the parallel task 312 writes all of the workfile pages containing the results 404 to a storage device 316a–316n. The preferred embodiment of storage devices 316a–316n is DASDs. Therefore, step 912 of the present invention writes the workfile to a DASD 316a–316n.

In step 914, the parallel task 312 writes all space map pages to DASD. The space map pages are descriptive pages about the contents of a workfile. They are used in performing space allocation and other mapping operations. There is one space map page for every 4096 workfile data pages. The space map pages are written to DASD because the coordinating DBMS 304 must reference them to locate and access the pages of a workfile.

After step 914, the parallel task 312 executes step 916. In step 916, the parallel task 312 sends a notify message to the coordinating DBMS 304 indicating that the workfile is available on DASD 316a–316n. The parallel task 312 proceeds to step 918 in which it determines if the coordinating DBMS 304 has sent a reply. A reply indicates to the parallel task 312 that the coordinating DBMS 304 has retrieved the results 404 from the workfile on DASD. If no reply has been received, the parallel task 312 suspends itself in step 920. The parallel task 312 will wait until, in step 918, a reply has been received.

In step 918, when the parallel task 312 receives a reply from the coordinating DBMS 304, it enters step 922. In step 922, the parallel task 312 deletes the workfile. In step 924, the parallel task has completed its processing and terminates.

If, in step 906, the parallel task 312 determines that the results 404 are to be returned to the coordinating DBMS 304 in a record format, the parallel task 312 advances to step 926. In step 926, the parallel task 312 produces rows in record out format and will continue such production until all processing is complete. From step 926, the parallel task 312 enters step 928 in which the produced rows are forwarded via a notify message to the coordinating DBMS 304. In step 930, the parallel task 312 determines the processing is complete or if more rows are to be produced. If more rows are to be produced, the parallel task 312 returns to step 926 where more rows are produced in record out format. This loop of steps 926, 928, and 930 is repeated until all results 404 are produced. In step 930, if no more rows are to be produced, the parallel task 312 enters step 924 and terminates.

8. Setting Bufferpool Allocation Thresholds

At run time, the originating DBMS 304 executes either a sequential or parallel plan 318 for a given query 302. When executing a parallel plan 318 for a single CPC or multi-CPCs, the originating DBMS 304 takes into account the current utilization and threshold values of each DBMS 304, 306a, 306b in the coupling facility 110 of the shared data DBMS system 300. This is necessary because the utilization on a DBMS 304, 306a, 306b may be such that it is not beneficial to run one or more parallel tasks 312. Therefore, the optimal degree of parallelism as derived at bind time, step 500, may not be appropriate due to the DBMSs 304, 306a, 306b utilization at run time. As a result the originating DBMS 304 may refine the degree of parallelism in step 738 according to DBMS 304, 306a, 306b utilization.

A DBMS 304, 306a, 306b uses bufferpools on its host CPC as data cache areas for accessing data. Each bufferpool comprises multiple buffer thresholds such that a certain quantity of buffers can be shielded from specific types of processing. Each buffer further comprises multiple pages.

The originating DBMS 304 looks at each DBMSs 304, 306a, 306b bufferpool usage to gauge how busy the shared data DBMS system 300 is. When attempting to execute query parallelism, the originating DBMS 304 is concerned with a long running query 302. Therefore, bufferpool usage is a good gauge because a DBMS 304, 306a, 306b with active buffers cannot accept many, if any, parallel tasks 312. Such a DBMS 304, 306a,306b is already I/O intensive, thus, any additional parallel tasks 312 relating to a data intensive query 302 would only increase I/O contention on that DBMS 304, 306a, 306b. The overhead cost of running query parallelism increases thereby eliminating any gain trying to be achieved. In this case, the originating DBMS 304 adjusts the optimum degree of parallelism in step 738 to account for the DBMSs 304, 306a, 306b buffer utilization. The degree of parallelism is lowered to a number of parallel tasks 312 that can be optimally run on the DBMSs 304, 306a, 306b.

The present invention allocates a fixed number of buffers for each parallel task 312 of a plan 318. In the preferred embodiment, the present invention allocates 64 buffers per tablespace or index per parallel task 312. Each parallel task 312 uses 32 of these allocated buffers during execution and the remaining 32 buffers for prefetch operations. Therefore, when the originating DBMS 304 attempts to allocate a parallel task 312 to a DBMS 304, 306a, 306b, it verifies that there are at least 64 buffers on the DBMS 304, 306a, 306b to accommodate the parallel task 312. The present invention is not limited to 64 buffers and persons skilled in the relevant arts may determine alternative thresholds for allocating parallel tasks 312.

Figure 10:
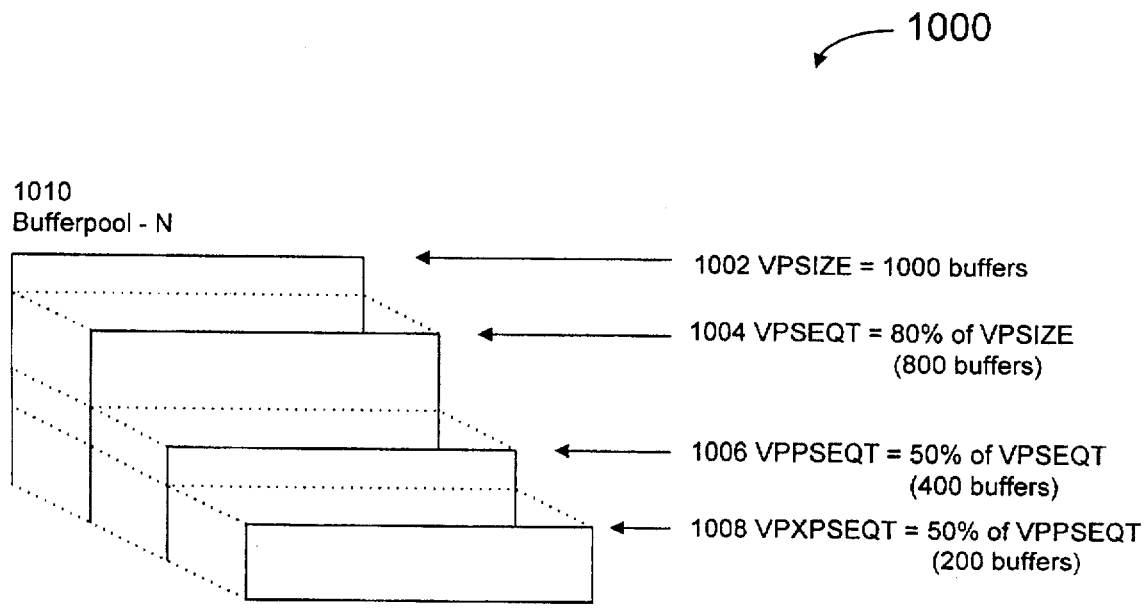
FIG. 10 is a block diagram showing bufferpool allocation thresholds.

The present invention allocates the buffers of a bufferpool to various types of processing. For example, in FIG. 10, a CPC has a virtual pool size (VPSIZE) 1002 of 1000 buffers 1002 in a specific bufferpool N 1010. From this 1000 buffers, the virtual pool sequential threshold (VPSEQT) 1004 is 800 buffers indicating that up to 80% of the total buffers in bufferpool N 1010 can be used for local sequential processing. From this 800 buffers, the virtual pool parallel sequential threshold (VPPSEQT) 1006 is 400 buffers indicating that up to 50% of VPSEQT 1004 can be used for local parallel processing. From this 400 buffers, the virtual pool cross parallel sequential threshold (VPXPSEQT) 1008 is 200 buffers indicating that up to 50% of VPPSEQT 1006 can be used for incoming parallel work. An originating DBMS 304 accesses these thresholds when determining whether to allocate a parallel task 312 to a coordinating DBMS 304 or assisting DBMSs 306a, 306b.

In FIG. 7 in step 714, when the originating DBMS 304 determines whether a single CPC parallel plan exceeds the originating DBMS's 304 utilization threshold, the originating DBMS 304 analyzes its own bufferpool utilization. The originating DBMS 304 compares its number of buffers available for local parallel processing with its threshold value VPPSEQT 1006 and the optimum degree of parallelism in the plan 318. In step 714, if its threshold value VPPSEQT 1006 is not exceeded, the originating DBMS 304 can perform local parallel processing on the single host CPC in step 718. If, however, in step 714, its threshold value VPPSEQT 1006 is exceeded, the originating DBMS 304 proceeds to step 708, and more specifically to step 738, to refine the optimum degree in the parallel plan and determine a new degree of parallelism that fits within the CPC's utilization.

In FIG. 7A, in step 726 when the coordinating DBMS 304 determines whether a current DBMS's 304, 306a, 306b inbound control would be exceeded if a parallel task 312 were assigned to the current DBMS 304, 306a, 306b, the coordinating DBMS 304 analyzes the current DBMS's 304, 306a, 306b bufferpool utilization. The coordinating DBMS 304 compares the number of buffers available for multi-CPC parallel processing with the threshold value VPXPSEQT 1008, taking into account the buffer allocation required for a new parallel task 312. If, in step 726, the current DBMS's 304, 306a, 306b threshold value VPXPSEQT 1008 is exceeded, then the coordinating DBMS 304 does not assign the parallel task 312 to the current DBMS 304, 306a, 306b. The coordinating DBMS 304 proceeds to step 736 and moves to the next DBMS in the list of available DBMSs to try to assign the parallel task 312. If, however, in step 726, the current DBMS's 304 threshold value VPXPSEQT 1008 would not be exceeded by assigning a parallel task 312 to the current DBMS 304, 306a, 306b, then the coordinating DBMS 304 proceeds to step 728 and assigns the parallel task 312 to the current DBMS.

In the present invention, a system administrator can set these bufferpool thresholds for each DB2 308a–308c as a means for tuning a CPC and a shared data DBMS system 300. The DB2 syntax for changing the threshold values to the example shown in FIG. 10 has the following syntax:
ALTER BUFFERPOOL (Bpname) VPSIZE (1000) VPSEQT (80) VPPSEQT (50) VPXPSEQT (50).

9. Global Compatible Class Locking

A natural result of a shared data DBMS system 300 is the parallel tasks 312 causing contention on locking database resources during the processing of the query 302. Therefore, in the present invention, it is imperative that the shared data DBMS system 300 treats all lock requests resulting from the parallel tasks 312 of a query 302 as belonging to the same "family." Under such a scheme, one parallel task 312 executing on one DBMS 304, 306a, 306b can share database resources with the other parallel tasks 312 distributed across the DBMSs 304, 306a, 306b.

Figure 11:
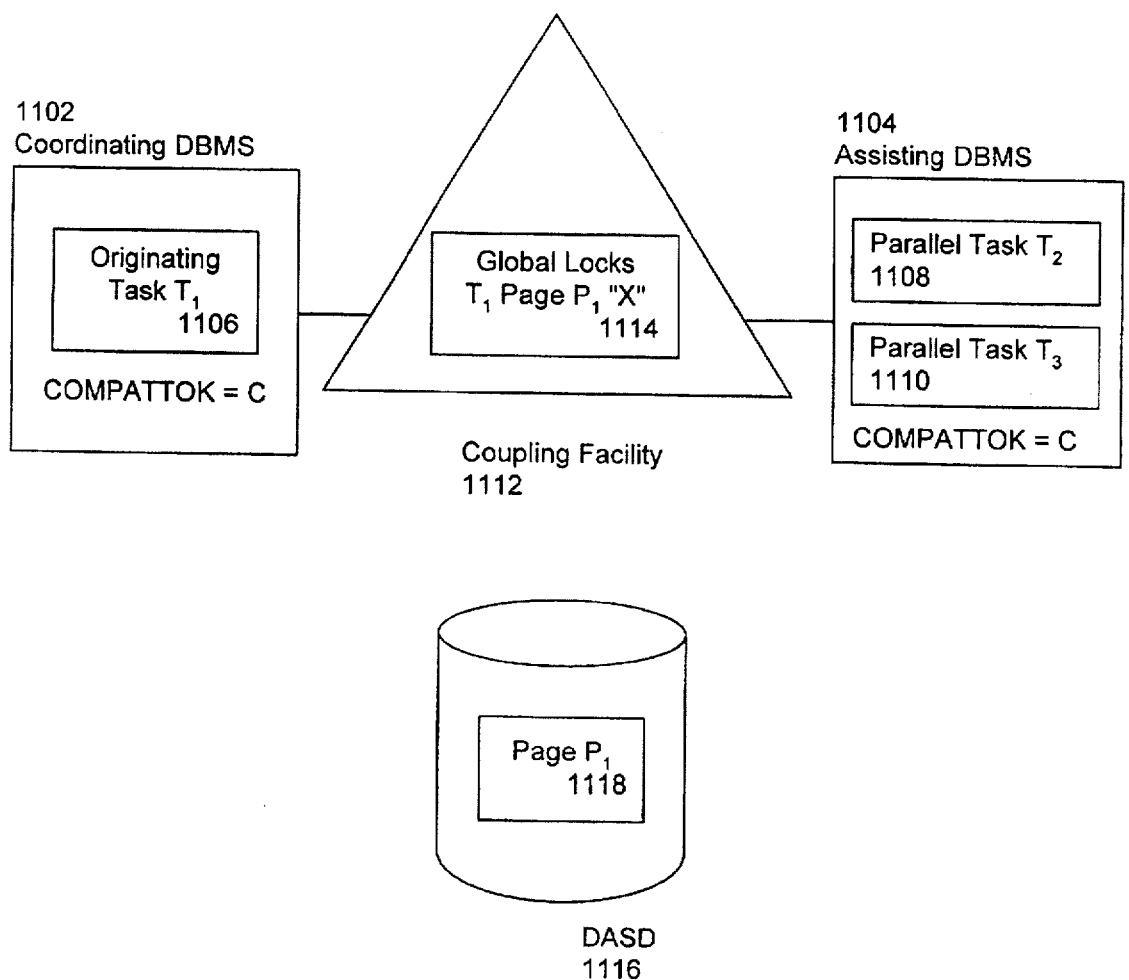
FIG. 11 is a block diagram showing global compatible class locking of query parallelism in a shared data DBMS system.

FIG. 11 describes global compatible class locking of the present invention. The present invention uses a global compatibility token as a key for locking and unlocking database resources among the parallel tasks 312 of a query 302. For illustration purposes, assume that a coordinating DBMS 1102 spawns an original task $T_1$ 1106 that holds an exclusive lock on page $P_1$ 1118 located on a DASD 1116. The original task $T_1$ generates a global compatibility token, COMPATTOK, and includes it with the plan 318 sent to the assisting DBMSs 306a, 306b. In this example, COMPATTOK=C.

Continuing with the example, the original task $T_1$ places an exclusive lock on page $P_1$ 1114 which is denoted in the coupling facility 1112 by the "X." Parallel tasks $T_2$ 1108 and $T_3$ 1110 reside on an assisting DBMS 1104 and want to access page $P_1$ 1118. Once the lock manager recognizes this contention, it executes an extra step to determine who owns the held lock. The lock manager serializes concurrent accesses to global data thereby ensuring data integrity. In this case, the lock manager would determine that the originating task $T_1$ 1106 owns the lock. The lock manager would then retrieve the global compatibility token from $T_1$ 1106 and compare that value with the value supplied by parallel tasks $T_2$ 1108 and $T_3$ 1110. If the token values match, then the lock manager allows the parallel tasks $T_2$ 1108 and $T_3$ 1110 to access the page $P_1$ 1118.

The compatibility token COMPATTOK is a 4 byte token unique throughout the entire shared data DBMS system 300. The token is generated by concatenating two values. First, each DBMS task 304, 306a, 306b executes on a separate CPC and has a thread control block called a cursor table. The cursor table is always greater than 254 bytes. Therefore, the first three bytes of a four (4) byte address to this cursor table is always unique within the CPC 304, 306a, 306b. Additionally, each DBMS 304, 306a, 306b has a unique one byte identifier called the member id. Thus, the originating DBMS 304 generates the compatibility token by concatenating together the three unique bytes of the cursor table address with the one byte member id. The one byte member id becomes the least significant byte of the token.

10. Bufferpool Coherency for Workfile Data

During multi-CPC parallelism within a shared data DBMS system 300, a workfile produced by a DBMS must be shared with other DBMSs in the system 300. The DBMS that produces a workfile is called a producing DBMS, and the DBMS that needs access to the workfile is called a consuming DBMS. This feature of the present invention is described in terms of multi-CPC query parallelism for convenience only. The present invention is not limited to multi-CPC query parallelism, but rather, applies in general to shared data DBMS systems 300. It would be apparent to a person skilled in the relevant arts how to adapt the present invention to other multi-CPC applications.

A producing DBMS 1204, such as an assisting DBMS 306a, 306b, generates results 404 in response to receiving a multi-CPC parallel plan 318 from a consuming DBMS 1202, such as a coordinating DBMS 304. The producing DBMS 1204 creates a new workfile and generates a unique token. The producing DBMS 1204 generates a unique token for each workfile created for multi-CPC work. The preferred embodiment of the token is a four (4) byte identifier representing an address pointer to the local memory storage of the workfile. It would be apparent to persons skilled in the relevant art to implement alternative methods for developing a unique token.

The producing DBMS 1204 writes the unique token to the workfile's control block and to each bufferpool page descriptor as it generates the results 404. When the producing DBMS 1204 completes a workfile, it flushes its local bufferpool of all the pages with the unique token associated with that workfile.

The producing DBMS 1204 also generates a unique timestamp that was discussed previously in reference to FIG. 9 in which the producing DBMS 1204 was the assisting DBMS 306a, 306b. In step 908, a producing DBMS 1204 generates a timestamp when it first creates a workfile. In the present invention, the timestamp is an eight (8) byte value representing a specific time as read from the processor. It would be apparent to persons skilled in the relevant art to implement alternative methods for developing a timestamp.

The consuming DBMS 1202 compares the workfile's timestamp with the timestamp of workfile pages already residing in its bufferpool 1206. The control flow of a consuming DBMS 1202 was discussed previously in reference to FIG. 8A in which the consuming DBMS 1202 was the coordinating DBMS 304.

Figure 12:
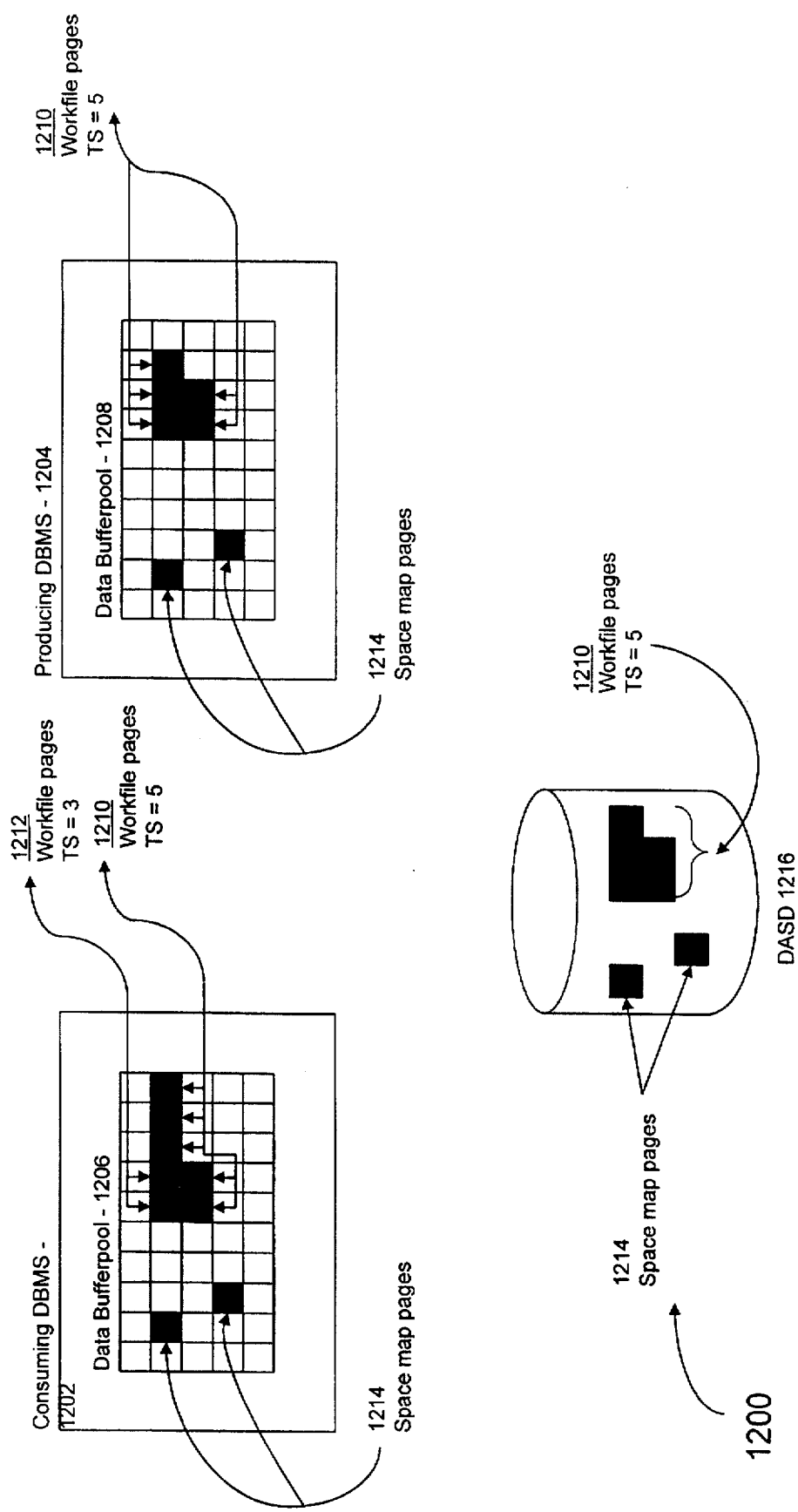
FIG. 12 is a block diagram showing bufferpool coherency for workfile data.

FIG. 12 is a block diagram further illustrating bufferpool coherency for workfile data within a shared data DBMS system 300 of the present invention. First, the producing DBMS 1204 generates a workfile 1210 in its data bufferpool 1208 for which the timestamp equal five (5). The timestamp is written to each page of the workfile as shown by the workfile 1210 in the data bufferpool 1208.

Second, when the producing DBMS 1204 has completed the workfile 1210 with timestamp equal to five, it forces the workfile 1210 from its data bufferpool 1208 to the DASD 1216. The producing DBMS 1204 also forces all of the space map pages 1214 from its data bufferpool 1208 to the DASD 1216. After the workfile 1210 and space map pages 1214 are forced to the DASD 1216, the producing DBMS 1202 notifies the consuming DBMS 1202 that the workfile data is available.

Third, the consuming DBMS 1202 accesses its data bufferpool 1206 to determine if the workfile pages 1210 with timestamp equals 5 are already present. If, in this case, the timestamp of the workfile pages in the bufferpool 1206 equals five, then the consuming DBMS 1202 knows not to read the workfile pages 1210 from the DASD 1216. If, however, the timestamp of the workfile pages 1212 equals three, the consuming DBMS 1202 knows that it does not have the correct workfile and must read the workfile 1210 from the DASD 1216.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

Having thus described our invention, what we claim as new and desire to secure by Letters patent is:

1. The method for a plurality of DBMSs to process a query by one or more assisting DBMSs processing one or more parallel tasks allocated by a coordinating DBMS that decomposed a query into a plan of a plurality of parallel tasks, comprising the following steps:
   (1) receiving the plan from the coordinating DBMS;
   (2) executing the parallel tasks allocated to the assisting DBMS by the coordinating DBMS in the plan; and
   (3) returning a result from the parallel tasks to the coordinating DBMS;
wherein any of said plurality of DBMSs may be the coordinating DBMS or the assisting DBMS.

2. A computer based system, comprising:
   a plurality of database management systems (DBMSs), wherein each DBMS includes:
     first receiving means for receiving a query from a user application;
     decomposing means for decomposing said query into a plurality of parallel tasks;
     allocating means for generating a plan that allocates said parallel tasks across said plurality DBMSs;
     sending means for sending said plan to said plurality DBMSs;
     second receiving means for receiving said plan from another one of said plurality of DBMSs;
     executing means for executing said parallel tasks as allocated to said DBMS in said plan;
     returning means for returning a result from said parallel tasks to said another one of said plurality of DBMSs; and
     third receiving means for receiving results from said parallel tasks and returning said results to said user application;

wherein a DBMS that receives said query from said user application is a coordinating DBMS and a DBMS that receives said plan is an assisting DBMS; and said plurality of DBMSs coupled to one or more storage devices wherein said coordinating DBMSs have read access to said storage devices and said assisting DBMSs have read-write access to said storage devices.

3. The computer system of claim 2, further comprising:

first determining means for determining if said query is a candidate for parallel processing across said assisting DBMSs; and second determining means for determining if said coordinating DBMS is authorized to allocate said parallel tasks to said assisting DBMSs.

4. The computer based system of claim 2, wherein said second determining means comprises:

RLST accessing means for accessing a resource limit specification table (RLST) having:

a first column dedicated to a user identifier for identifying the owner of a plan name;

a second column dedicated to said plan name for identifying a database plan; and a third column dedicated to a function value for disabling said coordinating DBMS from using a parallel processing mode when executing said plan name owned by said user identifier;

wherein said RLST accessing means accesses said RLST with said user identifier equal to said coordinating DBMS and said plan name equal to said plan.

5. The computer based system of claim 2, wherein said allocating means comprises:

fill means for allocating a subset of said parallel tasks to said coordinating DBMS, thereby generating a remainder of said parallel tasks that are not allocated;

spill means for allocating said remainder of said parallel tasks to said assisting DBMSs; and second decomposing means for decomposing said query into a new number of parallel tasks that can be allocated across said coordinating DBMS and said assisting DBMSs if said fill means and said spill means do not allocate all of said parallel tasks.

6. The computer system of claim 5, wherein said subset of said parallel tasks, allocated by said fill means, is a maximum number of said parallel tasks that said coordinating DBMS can optimally execute.

7. The computer system of claim 6, wherein said maximum number of parallel tasks allocated to said coordinating DBMS by said fill means is zero, and said spill means allocates said parallel tasks to said assisting DBMSs.

8. The computer system of claim 6, wherein said remainder of parallel tasks allocated to said assisting DBMSs by said spill means is zero, and said fill means allocates said parallel tasks to said coordinating DBMS.

9. The computer system of claim 5, wherein said spill means allocates said remainder of parallel tasks to said assisting DBMSs in a round robin manner.

10. The computer system of claim 9, wherein said spill means comprises:

determining means for determining whether bufferpool utilization of an assisting DBMS is below a threshold level; and means for allocating a parallel task to said assisting DBMS if it is determined that said bufferpool utilization of said assisting DBMS is below said threshold level.

11. The computer system of claim 2, wherein said allocating means comprises:

forced spill means for allocating said parallel tasks to said coordinating DBMS and said assisting DBMSs; and second decomposing means for decomposing said query into a new number of parallel tasks that can be allocated across said coordinating DBMS and said assisting DBMSs if said forced spill means does not allocate all of said parallel tasks.

12. The computer system of claim 11, wherein said forced spill means allocates said parallel tasks to said coordinating DBMS and said assisting DBMSs in a round robin manner.

13. The computer system of claim 11, wherein said forced spill means comprises:

determining means for determining whether bufferpool utilization of a coordinating DBMS or an assisting DBMS is below a threshold level;

means for allocating a parallel task to said coordinating DBMS or said assisting DBMS if it is determined that said bufferpool utilization of said coordinating DBMS or said assisting DBMS is below said threshold level.

14. A method for a plurality of database management systems (DBMSs) to process a query by one coordinating DBMS of said plurality of DBMSs decomposing a query into a plurality of parallel tasks and allocating the parallel tasks across the coordinating DBMSs and remaining one or more assisting DBMSs of said plurality of DBMSs, the method including the following steps that are performed by each coordinating DBMS:

(1) binding the query by decomposing the query into the plurality of parallel tasks and creating a plan for executing the parallel tasks;

(2) executing said plan for the query by allocating the plurality of parallel tasks across the coordinating DBMS and the assisting DBMSs;

(3) receiving results from the parallel tasks; and (4) returning said results wherein any of said plurality of DBMSs may be the coordinating DBMS or the assisting DBMS.

15. The method of step 14, further comprising the following steps that are performed by each assisting DBMS:

(5) receiving said plan from a coordinating DBMS;

(6) executing a subset of the parallel tasks that are allocated to the assisting DBMS in said plan; and (7) returning a result from said subset of parallel tasks to said coordinating DBMS.

16. The method of claim 14, wherein steps (2)–(4) are executed repeatedly for said plan.

17. The method of claim 14, wherein step (2) comprises the steps of:

(a) determining if the query is a candidate for parallel processing across the assisting DBMSs; and (b) determining if the coordinating DBMS is authorized to allocate the parallel tasks to the assisting DBMSs.

18. The method of claim 17, wherein step (b) comprises accessing a resource limit specification table (RLST).

19. The method of claim 14, wherein step (2) comprises the steps of:

(a) allocating a subset of the parallel tasks to the coordinating DBMS, thereby generating a remainder of the parallel tasks that are not allocated;

(b) allocating said remainder of the parallel tasks to the assisting DBMSs;

(c) decomposing the query into a new number of parallel tasks that can be allocated across the coordinating DBMS and the assisting DBMSs if steps (a)–(b) do not allocate all of the parallel tasks.

20. The method of claim 19, wherein said subset of the parallel tasks in step (a) is a maximum number of the parallel tasks that the coordinating DBMS can optimally execute.

21. The method of claim 19, wherein step (b) allocates said remainder of parallel tasks to the assisting DBMSs in a round robin manner.

22. The method of claim 19, wherein step (b) comprises the steps of:

(d) determining whether bufferpool utilization of an assisting DBMS is below a threshold level; and (e) allocating a parallel task to said assisting DBMS if it is determined in step (d) that said bufferpool utilization of said assisting DBMS is below said threshold level.

23. The method of claim 14, wherein step (2) comprises the steps of:

(a) allocating the parallel tasks to the coordinating DBMS and the assisting DBMSs; and (b) decomposing the query into a new number of parallel tasks that can be allocated across the coordinating DBMS and the assisting DBMSs if step (a) does not allocate all of the parallel tasks.

24. The method of claim 23, wherein step (a) allocates the parallel tasks to the coordinating DBMS and the assisting DBMSs in a round robin manner.

25. The method of claim 23, wherein step (a) comprises the steps of:

(c) determining whether bufferpool utilization of a coordinating DBMS or an assisting DBMS is below a threshold level; and (d) allocating a parallel task to said coordinating DBMS or said assisting DBMS if it is determined in step (c) that said bufferpool utilization of said coordinating DBMS or said assisting DBMS is below said threshold level.

26. A computer program product for use with a computer system, comprising:

a computer usable medium having computer readable program code means embodied in said medium for a plurality of database management systems (DBMSs) to process a query by one coordinating DBMS of said plurality of DBMSs decomoposing a query into a plurality of parallel tasks and allocating the parallel tasks across the coordinating DBMS and one or more assisting DBMSs, said computer program product having:

first computer readable program code means for receiving a query from a user application;

second computer readable program code means for decomposing said query into a plurality of parallel tasks;

third computer readable program code means for generating a plan that allocates said parallel tasks across said plurality of DBMSs;

fourth computer readable program code means for sending said plan to one or more of said plurality of DBMSs; and fifth computer readable program code means for receiving a plan from the coordinating DBMS;

sixth computer readable program code means for executing a subset of said parallel tasks allocated to said DBMS in said plan; and seventh computer readable program code means for returning a result from said parallel tasks to said coordinating DBMS.

27. The computer program product according to claim 26, further comprising:

sixth computer readable program code means for determining if said query is a candidate for parallel processing across said assisting DBMSs; and seventh computer readable program code means for determining if the coordinating DBMS is authorized to allocate said parallel tasks to said assisting DBMSs.

28. A program storage device readable by a machine, tangibly embodying a program of instructions executable by the machine to perform method steps for a plurality of database management systems (DBMSs) to process a query by one coordinating DBMS of said plurality of DBMSs decomposing a query into a plurality of parallel tasks and allocating the parallel tasks across the coordinating DBMS and remaining one or more assisting DBMSs of said plurality of DBMSs, the method including the following steps that are performed by each coordinating DBMS:

(1) binding the query by decomposing the query into the plurality of parallel tasks and creating a plan for executing the parallel tasks;

(2) executing said plan for the query by allocating the plurality of parallel tasks across the coordinating DBMS and the assisting DBMSs;

(3) receiving results from the parallel tasks; and (4) returning said results wherein any of said plurality of DBMSs may be the coordinating DBMS or the assisting DBMS.

29. The program storage device according to step 28, further comprising the following steps that are performed by each assisting DBMS:

(5) receiving said plan from a coordinating DBMS;

(6) executing a subset of the parallel tasks that are allocated to the assisting DBMS in said plan; and (7) returning a result from said subset of parallel tasks to said coordinating DBMS.

30. The program storage device according to step 28, further comprising the following steps:

(5) determining if the query is a candidate for parallel processing across the assisting DBMSs; and (6) determining if the coordinating DBMS is authorized to allocate the parallel tasks to the assisting DBMSs.

* * * * *